US009549124B2

(12) United States Patent
Duran et al.

(10) Patent No.: US 9,549,124 B2
(45) Date of Patent: *Jan. 17, 2017

(54) DAY AND NIGHT DETECTION BASED ON ONE OR MORE OF ILLUMINANT DETECTION, LUX LEVEL DETECTION, AND TILING

(71) Applicant: GOOGLE INC., Mountain View, CA (US)

(72) Inventors: Bill Duran, Santa Cruz, CA (US); Adrian Mircea Proca, Santa Cruz, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,348

(22) Filed: May 18, 2016

(65) Prior Publication Data

US 2016/0366337 A1 Dec. 15, 2016

Related U.S. Application Data

(63) Continuation of application No. 14/738,225, filed on Jun. 12, 2015, now Pat. No. 9,386,230.

(51) Int. Cl.
*H04N 5/225* (2006.01)
*H04N 9/73* (2006.01)
*H04N 3/14* (2006.01)
*H04N 5/232* (2006.01)
*H04N 5/33* (2006.01)

(52) U.S. Cl.
CPC ............ *H04N 5/23245* (2013.01); *H04N 5/33* (2013.01)

(58) Field of Classification Search
None
See application file for complete search history.

(56) References Cited

U.S. PATENT DOCUMENTS

| 2,997,935 A | 8/1961 | Scheffold |
| 3,782,260 A | 1/1974 | Ettischer et al. |
| D349,914 S | 8/1994 | Usui |
| D357,267 S | 4/1995 | Yotsuya |

(Continued)

OTHER PUBLICATIONS

0308 Brand USB 2.0 HD Night Vision Webcam Web Cam Camera Webcamera With Microphone Sucker Stand for PC Computer Laptop Notebook, Dec. 18, 2015, 13 pgs.

(Continued)

*Primary Examiner* — Aung S Moe
*Assistant Examiner* — Euel Cowan
(74) *Attorney, Agent, or Firm* — Morgan, Lewis & Bockius LLP

(57) ABSTRACT

A method for controlling a camera mode is executed at a camera including a controller, a sensor array, an IR filter, and a lens assembly. The camera is operated in a night mode. While in the night mode the IR filter is not interposed between the lens assembly and the sensor array, the camera receives at the sensor array ambient light that is not filtered by the IR filter, determines whether the received ambient light is due to a light source other than an IR light source, and detects a light level of the received ambient light. The camera switches the operation of the camera from the night mode to a day mode when it is determined the received ambient light is due to a light source other than an IR light source and that the light level of the received ambient light exceeds a first threshold.

20 Claims, 25 Drawing Sheets

Camera Image 1220

(56) References Cited

U.S. PATENT DOCUMENTS

| | | |
|---|---|---|
| D372,490 S | 8/1996 | Sheffield et al. |
| D385,571 S | 10/1997 | Abrams |
| 5,862,428 A | 1/1999 | An |
| 5,963,253 A | 10/1999 | Dwyer |
| 5,978,028 A | 11/1999 | Yamane |
| D429,269 S | 8/2000 | Renkis |
| D429,743 S | 8/2000 | Renkis |
| 6,141,052 A | 10/2000 | Fukumitsu et al. |
| 6,147,701 A | 11/2000 | Tamura et al. |
| D442,202 S | 5/2001 | Pfeifer et al. |
| D445,123 S | 7/2001 | Shen |
| 6,268,882 B1 | 7/2001 | Elberbaum |
| D446,534 S | 8/2001 | Zimmer |
| D447,758 S | 9/2001 | Lin et al. |
| D449,630 S | 10/2001 | Rak et al. |
| D452,259 S | 12/2001 | Choi |
| 6,357,936 B1 | 3/2002 | Elberbaum |
| D455,164 S | 4/2002 | Tsang et al. |
| 6,462,781 B1 | 10/2002 | Arnold |
| D467,952 S | 12/2002 | Nakamura |
| D469,775 S | 2/2003 | Bradley |
| D470,874 S | 2/2003 | Chiu |
| D470,875 S | 2/2003 | Liao |
| 6,515,275 B1 | 2/2003 | Hubel et al. |
| 6,634,804 B1 | 10/2003 | Toste et al. |
| 6,650,694 B1 | 11/2003 | Brown et al. |
| 6,678,001 B1 | 1/2004 | Elberbaum |
| 6,714,236 B1 | 3/2004 | Wada et al. |
| 6,727,954 B1 | 4/2004 | Okada et al. |
| D489,388 S | 5/2004 | Saito et al. |
| 6,762,790 B1 | 7/2004 | Matko et al. |
| D511,352 S | 11/2005 | Oliver et al. |
| 7,066,664 B1 | 6/2006 | Sitoh et al. |
| 7,076,162 B2 | 7/2006 | Yamashita |
| D527,755 S | 9/2006 | Wu |
| 7,151,565 B1 | 12/2006 | Wada et al. |
| D534,938 S | 1/2007 | Beasley et al. |
| D537,097 S | 2/2007 | Freeman |
| D542,320 S | 5/2007 | Cheng |
| D552,649 S | 10/2007 | Logan et al. |
| D552,659 S | 10/2007 | Stephens et al. |
| D555,692 S | 11/2007 | Liu et al. |
| 7,290,740 B2 | 11/2007 | Joy et al. |
| D558,250 S | 12/2007 | Hsia |
| D563,446 S | 3/2008 | Stephens et al. |
| D575,316 S | 8/2008 | Liu et al. |
| 7,443,446 B2 | 10/2008 | Seo |
| 7,552,340 B2 | 6/2009 | Ooi et al. |
| 7,586,537 B2 | 9/2009 | Konishi et al. |
| D606,105 S | 12/2009 | Hinkel |
| 7,646,425 B2 | 1/2010 | Bohaker et al. |
| D610,601 S | 2/2010 | Melder |
| D614,223 S | 4/2010 | Kim et al. |
| D627,815 S | 11/2010 | Oba |
| D628,223 S | 11/2010 | Kao et al. |
| 7,930,369 B2 | 4/2011 | Marriott et al. |
| D638,461 S | 5/2011 | Kim et al. |
| 7,986,369 B1 | 7/2011 | Burns |
| D648,766 S | 11/2011 | Chen |
| D651,229 S | 12/2011 | Tan et al. |
| D651,230 S | 12/2011 | Tan et al. |
| 8,072,536 B1 | 12/2011 | Campbell |
| D651,633 S | 1/2012 | Park et al. |
| 8,139,122 B2 | 3/2012 | Rolston |
| D657,410 S | 4/2012 | Helaoui et al. |
| 8,165,146 B1 | 4/2012 | Melick et al. |
| 8,174,972 B2 | 5/2012 | Cernius et al. |
| D678,929 S | 3/2013 | Hancock |
| 8,402,145 B2 | 3/2013 | Holden et al. |
| D687,085 S | 7/2013 | Manson |
| 8,504,707 B2 | 8/2013 | Toebes et al. |
| D694,305 S | 11/2013 | Katori et al. |
| D697,119 S | 1/2014 | Park et al. |
| 8,625,024 B2 | 1/2014 | Hsu |
| D700,232 S | 2/2014 | Ramsay et al. |
| D719,205 S | 12/2014 | Matsumoto |
| D729,296 S | 5/2015 | Shelton |
| D730,422 S | 5/2015 | Kim et al. |
| D733,781 S | 7/2015 | Chen |
| D734,801 S | 7/2015 | Yang |
| 9,102,055 B1 | 8/2015 | Konolige et al. |
| D740,871 S | 10/2015 | Moon et al. |
| D742,954 S | 11/2015 | Simonelli et al. |
| D743,465 S | 11/2015 | Aglassinger et al. |
| D745,916 S | 12/2015 | Oh |
| D746,350 S | 12/2015 | Li |
| D748,709 S | 2/2016 | Jeong |
| D755,880 S | 5/2016 | Luo et al. |
| 9,330,307 B2 | 5/2016 | Litvak et al. |
| 2002/0107591 A1 | 8/2002 | Gabai et al. |
| 2002/0141418 A1 | 10/2002 | Ben-Dor et al. |
| 2002/0186317 A1 | 12/2002 | Kayanuma |
| 2002/0191082 A1 | 12/2002 | Fujino et al. |
| 2003/0164881 A1 | 9/2003 | Ohe et al. |
| 2003/0169354 A1 | 9/2003 | Aotsuka |
| 2003/0193409 A1 | 10/2003 | Crank |
| 2003/0216151 A1 | 11/2003 | Kitano et al. |
| 2004/0132489 A1 | 7/2004 | Ryley et al. |
| 2004/0211868 A1 | 10/2004 | Holmes et al. |
| 2004/0247203 A1 | 12/2004 | Dell'Eva |
| 2005/0062720 A1 | 3/2005 | Rotzoll et al. |
| 2005/0128336 A1 | 6/2005 | Toledano et al. |
| 2005/0149213 A1 | 7/2005 | Guzak et al. |
| 2005/0151042 A1 | 7/2005 | Watson |
| 2005/0200751 A1 | 9/2005 | Weaver |
| 2005/0212958 A1 | 9/2005 | Su et al. |
| 2005/0227217 A1 | 10/2005 | Wilson |
| 2005/0230583 A1 | 10/2005 | Wu |
| 2005/0237425 A1 | 10/2005 | Lee et al. |
| 2005/0243022 A1 | 11/2005 | Negru |
| 2005/0243199 A1 | 11/2005 | Bohaker et al. |
| 2005/0275723 A1 | 12/2005 | Sablak et al. |
| 2006/0017842 A1 | 1/2006 | Jun |
| 2006/0024046 A1 | 2/2006 | Jones et al. |
| 2006/0086871 A1 | 4/2006 | Joseph et al. |
| 2006/0109375 A1 | 5/2006 | Ho et al. |
| 2006/0109613 A1 | 5/2006 | Chen |
| 2006/0123129 A1 | 6/2006 | Toebes et al. |
| 2006/0123166 A1 | 6/2006 | Toebes et al. |
| 2006/0210259 A1 | 9/2006 | Matsumoto |
| 2006/0262194 A1 | 11/2006 | Swain |
| 2006/0282866 A1 | 12/2006 | Kuo |
| 2007/0001087 A1 | 1/2007 | Shyu et al. |
| 2007/0011375 A1 | 1/2007 | Kumar |
| 2007/0036539 A1 | 2/2007 | Martinez et al. |
| 2007/0083791 A1 | 4/2007 | Panesar et al. |
| 2007/0222888 A1 | 9/2007 | Xiao et al. |
| 2008/0001547 A1 | 1/2008 | Negru |
| 2008/0005432 A1 | 1/2008 | Kagawa |
| 2008/0056709 A1 | 3/2008 | Huang et al. |
| 2008/0074535 A1 | 3/2008 | Ohsuga |
| 2008/0151052 A1 | 6/2008 | Erel et al. |
| 2008/0186150 A1 | 8/2008 | Kao |
| 2008/0189352 A1 | 8/2008 | Mitchell et al. |
| 2008/0231699 A1 | 9/2008 | Konishi et al. |
| 2008/0291260 A1 | 11/2008 | Dignan et al. |
| 2008/0309765 A1 | 12/2008 | Dayan et al. |
| 2009/0019187 A1 | 1/2009 | Okuma |
| 2009/0027570 A1 | 1/2009 | Fujinawa |
| 2009/0102715 A1 | 4/2009 | Lou et al. |
| 2009/0141918 A1 | 6/2009 | Chris et al. |
| 2009/0141939 A1 | 6/2009 | Chambers et al. |
| 2009/0195655 A1 | 8/2009 | Pandey |
| 2009/0245268 A1 | 10/2009 | Pugliese, IV |
| 2009/0248918 A1 | 10/2009 | Diab et al. |
| 2009/0289921 A1 | 11/2009 | Mickelson et al. |
| 2009/0296735 A1 | 12/2009 | Cernius et al. |
| 2009/0309969 A1 | 12/2009 | Wendler |
| 2010/0026811 A1 | 2/2010 | Palmer |
| 2010/0039253 A1 | 2/2010 | Zang et al. |
| 2010/0076600 A1 | 3/2010 | Cross et al. |
| 2010/0085749 A1 | 4/2010 | Bezgachev et al. |
| 2010/0109878 A1 | 5/2010 | Desrosiers |
| 2010/0180012 A1 | 7/2010 | Heo et al. |

(56) References Cited

U.S. PATENT DOCUMENTS

| | | |
|---|---|---|
| 2010/0199157 A1 | 8/2010 | Takaoka et al. |
| 2010/0271503 A1 | 10/2010 | Safaee-Rad et al. |
| 2010/0306399 A1 | 12/2010 | Khosravi et al. |
| 2010/0314508 A1 | 12/2010 | Bevirt et al. |
| 2010/0328475 A1 | 12/2010 | Thomas et al. |
| 2011/0007159 A1 | 1/2011 | Camp et al. |
| 2011/0102438 A1 | 5/2011 | Mathe et al. |
| 2011/0102588 A1 | 5/2011 | Trundle et al. |
| 2011/0134313 A1 | 6/2011 | Kato |
| 2011/0158637 A1 | 6/2011 | Jung et al. |
| 2011/0161076 A1 | 6/2011 | Davis et al. |
| 2011/0193964 A1 | 8/2011 | McLeod |
| 2011/0193967 A1 | 8/2011 | Matsumoto et al. |
| 2011/0205965 A1 | 8/2011 | Sprigg et al. |
| 2011/0231903 A1 | 9/2011 | Springer et al. |
| 2011/0234803 A1 | 9/2011 | Nakajima et al. |
| 2011/0267492 A1 | 11/2011 | Prentice et al. |
| 2011/0285813 A1 | 11/2011 | Girdzijauskas et al. |
| 2011/0293137 A1 | 12/2011 | Gurman et al. |
| 2011/0299728 A1 | 12/2011 | Markovic et al. |
| 2012/0081009 A1 | 4/2012 | Shteynberg |
| 2012/0105632 A1 | 5/2012 | Renkis |
| 2012/0127270 A1 | 5/2012 | Zhang et al. |
| 2012/0140068 A1 | 6/2012 | Monroe et al. |
| 2012/0162416 A1 | 6/2012 | Su et al. |
| 2012/0194650 A1 | 8/2012 | Izadi et al. |
| 2012/0236373 A1 | 9/2012 | Oyama |
| 2012/0246359 A1 | 9/2012 | Scragg, Jr. et al. |
| 2012/0262575 A1 | 10/2012 | Champagne et al. |
| 2012/0263450 A1 | 10/2012 | Totani |
| 2013/0053657 A1 | 2/2013 | Ziarno et al. |
| 2013/0156260 A1 | 6/2013 | Craig |
| 2013/0162629 A1 | 6/2013 | Huang et al. |
| 2013/0314544 A1 | 11/2013 | Ban |
| 2013/0321564 A1 | 12/2013 | Smith et al. |
| 2013/0342653 A1 | 12/2013 | McCloskey et al. |
| 2014/0032796 A1 | 1/2014 | Krause |
| 2014/0047143 A1 | 2/2014 | Bateman et al. |
| 2014/0049609 A1 | 2/2014 | Wilson et al. |
| 2014/0119604 A1 | 5/2014 | Mai et al. |
| 2014/0168421 A1 | 6/2014 | Xu et al. |
| 2014/0241387 A1 | 8/2014 | Ortiz |
| 2014/0270387 A1 | 9/2014 | Hoof et al. |
| 2014/0333726 A1 | 11/2014 | Tokui et al. |
| 2014/0375635 A1 | 12/2014 | Johnson et al. |
| 2015/0052029 A1 | 2/2015 | Wu et al. |
| 2015/0120389 A1 | 4/2015 | Zhang et al. |
| 2015/0154467 A1 | 6/2015 | Feng et al. |
| 2015/0170371 A1 | 6/2015 | Muninder et al. |
| 2015/0181198 A1 | 6/2015 | Baele et al. |
| 2015/0228114 A1 | 8/2015 | Shapira et al. |
| 2016/0012588 A1 | 1/2016 | Taguchi et al. |
| 2016/0022181 A1 | 1/2016 | Valsan et al. |
| 2016/0094763 A1 | 3/2016 | Patel |
| 2016/0094829 A1 | 3/2016 | Georgiev et al. |
| 2016/0261829 A1 | 9/2016 | Olsson et al. |

OTHER PUBLICATIONS

720p TF Card IP Wireless Camera Indoor Built-In Microphone Support Two Way Intercom for Smart Home Life and Unique PIR Alarm, Dec. 18, 2015, 3 pgs.

Adipranata, Fast method for multiple human face segmentation in color image, 2008 Second Int'l Conference on Future Generation Communcation and Networking, IEEE, 2008, 4 pgs.

Buy Svb Ladybird Tripod Webcam 4 Mega Pixel—4 Megapixel Web Cam Online, Best Prices in India: Rediff Shopping, Dec. 16, 2015, 3 pgs.

Drivers—Video Cam: Download Drivers for (Genius VideoCAM NB) Visual/Video Camera, Computer Question Help, Jul. 3, 2008, 2 pgs.

Ebay, Belkin F7D7601AU, Net Cam IP WIFI Baby Pet Monitor Camera Security Night Vision, Dec. 15, 2015, 5 pgs.

Ebay, Lot of 2 USB WebCam Web Cam Camera Logitech Quickcam HP Hewlett Packard, Dec. 16, 2015, 3 pgs.

Ebay, Motorola, MBP421 Digital Video & Sound Rechargeable Baby Monitor 1.8" LCD Screen, Dec. 15, 2015, 5 pgs.

Ebay, New Smallest Mini Camera Camcorder Video Recorder DVR Spy Hidden Pinhole Web Cam, Dec. 2, 2015, 4 pgs.

FabulaTech, What is USB for Remote Desktop, Dec. 12, 2011, 2 pgs, http://web.archive.org/web/20111212070644/http://www.usb-over-network.com/usb-for-remote-desktop.html.

FabulaTech, What is USB over Network, Dec. 17, 2011, 2 pgs, http://web.archive.org/web/20111217080253/http://www.usb-over-network.com/usb-over-network.html.

Goods in Stock PC Camera USB Plug and Play Free Driver Digital Webcam Stand Web Camera, Dec. 18, 2015, 12 pgs.

Hampapur, Smart surveillance: applications, technologies and implications, Information Communications and Signal Processing 2, 2003, pp. 1133-1138.

Heo, Fusion of visual and thermal face recognition techniques: A comparative study. Univ. of Tennessee, Knoxville, TN, 2003, 75 pgs.

Input Devices on Pintrest, Computers, Mice and Apples, Tanna Darty, Dec. 15, 2015, 1 pg.

Ion Camera, The Home Pro Wi-Fi Wireless Cloud Video Monitoring Security Camera (Black): Camera & Photo, Dec. 15, 2015, 6 pgs.

Joel Johnson, Glowdoodle Turns Your Crappy Webcam in a Crappier Webcam (in a good way), webcam—Boing Boing, Dec. 16, 2015, 8 pgs.

John Lewis, Samsung SEB-1019RW Add-On Night Vision Baby Monitor Camera, Dec. 15, 2015, 2 pgs.

Kyo-Tux, IconArchive, Device WebCam Icon, Phuzion Iconset, Jun. 8, 2010, 3 pgs.

Linksys Wireless-N Internet Home Monitoring Camera: Home Security Systems: Camera & Photo, Amazon.com, Dec. 15, 2015, 7 pgs.

Logi Circle: Portable Home Surveillance Camera from Logitech (video), AppleApple.Top World News, Feb. 10, 2015, 5 pgs.

Mini Universal Tripod Stand for Digital Camera and Webcam A33-in Tripods from Consumer Electronics on Aliexpress.com, Alibaba Group, Store: Angel One-Stop Shopping Center, Dec. 16, 2015, 3 pgs.

Parent, Android USB Port Forwarding, Dec. 26, 2011, 7 pgs, http://www.codeproject.com/Articles/191930/Android-Usb-Port-Forwarding.

Restore.Solutions, Numus Software, USB/VID, Syntek Web Cam Device Drivers, Dec. 12, 2015, 10 pgs.

Silberman, Indoor Segmentation and Support Ingerence from RGBD Images, Computer Vision—ECCV 2012, Springer Berlin Heidelbert, Oct. 2012, pp. 746-780.

SIV Ai-Ball Very Small Hidden IP Network Camera Battery Powered Wireless IP Camera, Alibaba.com, 1999-2015, 7 pgs.

TechAllianz, How to Pick The Right Webcam, Satyakam, Jan. 22, 2013, 4 pgs.

Trek Ai-Ball Mini WiFi Spy Cam IP Wireless Camera for Iphone / Android /Ipad, Tmart, www.tmart.com, Dec. 18, 2015, 6 pgs.

Tripod Support for a QuickCam (or other webcam), Instructables, 2015, 3 pgs.

USB/IP Project, USB Request Over IP Network, Dec. 27, 2011, 5 pgs, http://web.archive.org/web/20111227171215/http://usbip.sourceforge.net/.

Web Camera 6 Stock Photo, Dreamstime, Dec. 16, 2015, 2 pgs.

1400

| 1402 | In a camera including a controller, memory storing instructions for execution by the controller, a color sensor array comprising a plurality of sensor locations, the sensor locations including first, second and third pixels each having respective peak responses at different respective visible light frequencies, and a lens assembly that is configured to focus light on the sensor array |

| 1404 | When the camera mode is a night mode and the sensor is exposed to ambient light via the lens assembly:
    detect a first light component of the ambient light by averaging output signals from the first pixels;
    detect a second light component of the ambient light by averaging output signals from the second pixels;
    detect a third light component of the ambient light by averaging output signals from the third pixels;
    determine based on respective values of the first, second and third light components whether the ambient light is due to other an IR light source; and
    detect the ambient light level; |

| 1406 | Based on a determination that the ambient light is due to other than an IR light source and the ambient light level exceeds a first lux threshold, initiate a change of the camera mode to a day mode; |

| 1408 | Based on a determination that the ambient light is due to other than an IR light source and the ambient light threshold does not exceed the first lux threshold, maintain the camera in the night mode. |

Figure 14A

DAY AND NIGHT DETECTION BASED ON ONE OR MORE OF ILLUMINANT DETECTION, LUX LEVEL DETECTION, AND TILING

RELATED APPLICATIONS

This application is a continuation of U.S. patent application Ser. No. 14/738,225, filed Jun. 12, 2015, entitled "Day and Night Detection Based on One or More of Illuminant Detection, Lux Level Detection, and Tiling," which is hereby incorporated by reference in its entirety.

This application is related to the following application, which is hereby incorporated by reference in its entirety: U.S. patent application Ser. No. 14/723,276, filed on May 27, 2015, entitled "Multi-mode LED Illumination System."

TECHNICAL FIELD

The disclosed implementations relate generally to controlling a camera with day and night modes, including, but not limited, deciding when to change a camera from night to day mode.

BACKGROUND

Some security cameras operate in one of two modes depending on the ambient lighting conditions. Day mode is used when there is sufficient ambient light to adequately illuminate the scene. Night mode (or IR mode) is used when there is not enough ambient light to adequately illuminate the scene, in which case the camera can provide its own IR illumination (e.g., using onboard IR LEDs).

One challenge for such cameras is deciding when to switch from Night mode to Day mode. Typically, Night mode is maintained until the camera detects an external light source that provides enough light for Day mode operation. This is a challenge in Night mode as the camera needs to evaluate the amount of visible ambient light from external light sources, but many light sources provide a combination of both IR and visible light, and in Night mode the camera sensor is responsive to both IR and visible light.

As a result, in a situation where a light source provides a high proportion of IR light in comparison to visible light, a camera in Night mode can switch into Day mode even though there is not enough visible ambient light to illuminate the scene. This can result in oscillations between Day mode and Night mode (e.g., after switching from Night to Day mode, the camera will determines that there is not enough visible light for Day mode operation, so will switch back to Night mode, and so on).

Traditional mode switching methods are also commonly fooled into switching from Night mode to Day mode in response to bright but narrow-beam light sources, such as flashlights or car headlights, that only provide light for a small portion of a scene. When exposed to such lights a camera will often switch to Day mode, which results in captured images being almost entirely dark due to lack of adequate ambient light.

SUMMARY

Accordingly, there is a need for a security camera that implements more effective methods for deciding when to switch from Night mode to Day mode.

In accordance with some implementations, systems and methods are described herein that provide more effective Night mode to Day mode switching in a camera. The described systems and methods provide one or more advantages in comparison to prior methods:

reduce Night mode to Day mode to Night mode oscillations;

address false Day mode situations (e.g., when a flashlight in a scene triggers the camera to switch to Day mode);

reliably detect visible illuminants containing high levels of infrared (e.g. sunlight or incandescent light sources) and adjust Night to Day mode switching thresholds accordingly; and have more consistent lux level switching regardless of illuminant color temperature.

In particular, the systems and methods described herein utilize a combination of illuminant detection, lux level detection, and tiling to determine when to switch from Night mode to Day mode without the attendant problems observed in prior art approaches to mode switching.

In some implementations, a method for Night to Day mode switching is performed at a camera including a controller, memory storing instructions for execution by the controller, a color sensor array comprising a plurality of sensor locations, the sensor locations including first, second and third pixels each having respective peak responses at different respective visible light frequencies, and a lens assembly that is configured to focus light on the sensor array. The method includes: when the camera mode is a night mode and the sensor is exposed to ambient light via the lens assembly: detecting a first light component of the ambient light by averaging output signals from the first pixels; detecting a second light component of the ambient light by averaging output signals from the second pixels; detecting a third light component of the ambient light by averaging output signals from the third pixels; determining based on respective values of the first, second and third light components whether the ambient light is due to other an IR light source; detecting the ambient light level; based on a determination that the ambient light is due to other than an IR light source and the ambient light level exceeds a first lux threshold, initiating a change of the camera mode to a day mode; based on a determination that the ambient light is due to other than an IR light source and the ambient light threshold does not exceed the first lux threshold, maintaining the camera in the night mode.

In some implementations, the method further includes: determining based on values of the first, second and third light components whether the ambient light is due to sunlight or an incandescent light source; and based on a determination that the ambient light is due to sunlight or an incandescent light source, initiating a change of the camera mode to the day mode only when the ambient light level exceeds a second lux threshold higher than the first lux threshold.

In some implementations, the method further includes: obtaining a first ratio of the first to the second lighting components of the ambient light; obtaining a second ratio of the third to the second lighting components of the ambient light; and obtaining a graph characterizing respective types of light source based on a combination of the first and second ratios associated with the respective types of light sources; wherein determining whether the ambient light is due to other than an IR light source includes determining based on the graph whether a light source characterized by the first ratio and the second ratio is other than an IR light source.

In some implementations, the graph recited above identifies a first region defined by specific respective ranges of the first and the second ratios as being associated with sunlight or incandescent light sources; wherein determining whether the ambient light is due to sunlight or an incandescent light source includes determining based on the graph whether a point defined by the first ratio and the second ratio lies within the first region.

In some implementations, the first, second and third light components are red, green and blue.

In some implementations, determining whether the ambient light is due to other than an IR light source includes determining that a point defined by the first ratio and the second ratio is substantially different from (1, 1).

In some implementations, the camera includes a gain controller that adjusts analog gain of the sensor array based on the ambient light level; such that detecting the ambient light level includes obtaining the analog gain of the sensor array.

In some implementations, the analog gain of the sensor varies with a frame rate of the camera, the method further including: determining a first frame rate of the camera used to detect the first, second and third light components; and normalizing the obtained analog gain of the sensor based on a first difference between the first frame rate and a predefined frame rate and predefined associated differences in analog sensor gain based on the first difference.

In some implementations, the camera includes an IR filter with a first position in which it is interposed between the lens and the sensor array and a second position in which it is not interposed between the lens and sensor array, the method further including: as part of initiating a change of the camera mode to the day mode, switching the camera mode to the day mode and causing the IR filter to be moved from the second position to the first position.

In some implementations, the camera includes an auto white balance processor that provides the obtained first and second ratios.

In some implementations, the color sensor array is one tile of a plurality of tiles in a color sensor array system and the method of claim 1 is performed for each of the tiles, such that a respective mode change signal is generated for a respective tile for which the ambient light at that respective tile is due to other than an IR light source prior to initiating the change of the camera mode to the day mode; the method further comprising: determining a total number of the mode change signals for the color sensor array system; determining whether the total number of the mode change signals exceeds a predetermined mode change threshold based on a total number of tiles in the color sensor array system; and when the total number of the mode change signals exceeds the mode change threshold, initiating the change of the camera mode to the day mode.

In some implementations, the graph recited herein is represented using two look-up tables, each addressable by a first index representing one of the first ratios and a second index representing one of the second ratios; wherein a first one of the lookup tables defines combinations of the first and second ratios associated respectively with IR light sources and other than IR light sources, and a second one of the lookup tables defines combinations of the first and second ratios associated with sunlight and incandescent lights.

In some implementations, the first lookup table encodes with 1's first table locations associated with other than IR light sources and with 0's first table locations associated with IR light sources, such that the first lookup table is almost entirely filled with all 1's apart from table locations associated with pairs of first and second ratios substantially similar to (1.1).

In some implementations, the second lookup table corresponds to a higher-resolution version of a sub-region of the first lookup table, wherein the second lookup table encodes with 1's second table locations associated with sunlight and incandescent light sources and with 0's second table locations associated with other than sunlight and incandescent light sources.

In yet another aspect, some implementations include a system for controlling a camera mode including: a controller, memory storing one or more programs for execution by the controller, a color sensor array comprising a plurality of sensor locations, the sensor locations including first, second and third pixels each having respective peak responses at different respective visible light frequencies, and a lens assembly that is configured to focus light on the sensor array, the one or more programs including instructions for performing any of the methods described herein (e.g., any of the methods described above).

In yet another aspect, some implementations include a non-transitory computer-readable storage medium storing one or programs for execution by a camera system that includes a controller, memory storing one or more programs for execution by the controller, a color sensor array comprising a plurality of sensor locations, the sensor locations including first, second and third pixels each having respective peak responses at different respective visible light frequencies, and a lens assembly that is configured to focus light on the sensor array, the one or more programs including instructions for performing any of the methods described herein (e.g., any of the methods described above).

Thus, a camera and camera program modules are provided that implement more effective methods for deciding when to switch from Night mode to Day mode. Such methods may complement or replace conventional methods for controlling camera modes.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 14A-14C illustrate a flowchart diagram of a method for deciding when to switch from Night mode to Day mode in accordance with some implementations.

Like reference numerals refer to corresponding parts throughout the several views of the drawings.

DESCRIPTION OF IMPLEMENTATIONS

Figure 1:
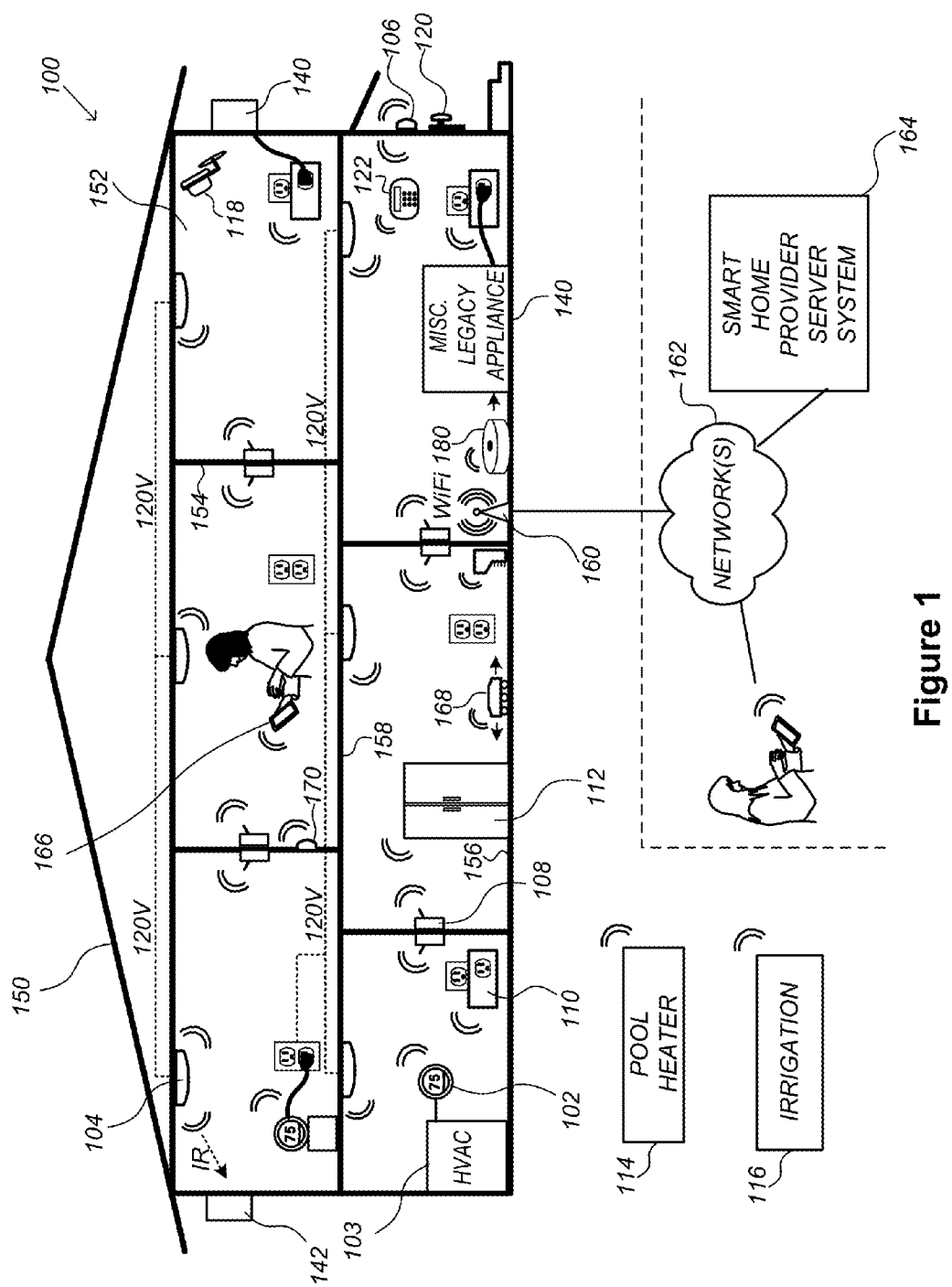
FIG. 1 is an example smart home environment, in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, one or more devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. In some implementations, cameras 118 also capture video when other conditions or hazards are detected, in order to provide visual monitoring of the smart home environment 100 when those conditions or hazards occur. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). For example, cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may include one or more sound and/or vibration sensors for detecting abnormal sounds and/or vibrations. These sensors may be integrated with any of the devices described above. The sound sensors detect sound above a decibel threshold. The vibration sensors detect vibration above a threshold directed at a particular area (e.g., vibration on a particular window when a force is applied to break the window).

Conditions detected by the devices described above (e.g., motion, sound, vibrations, hazards) may be referred to collectively as alert events.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

Figure 2:
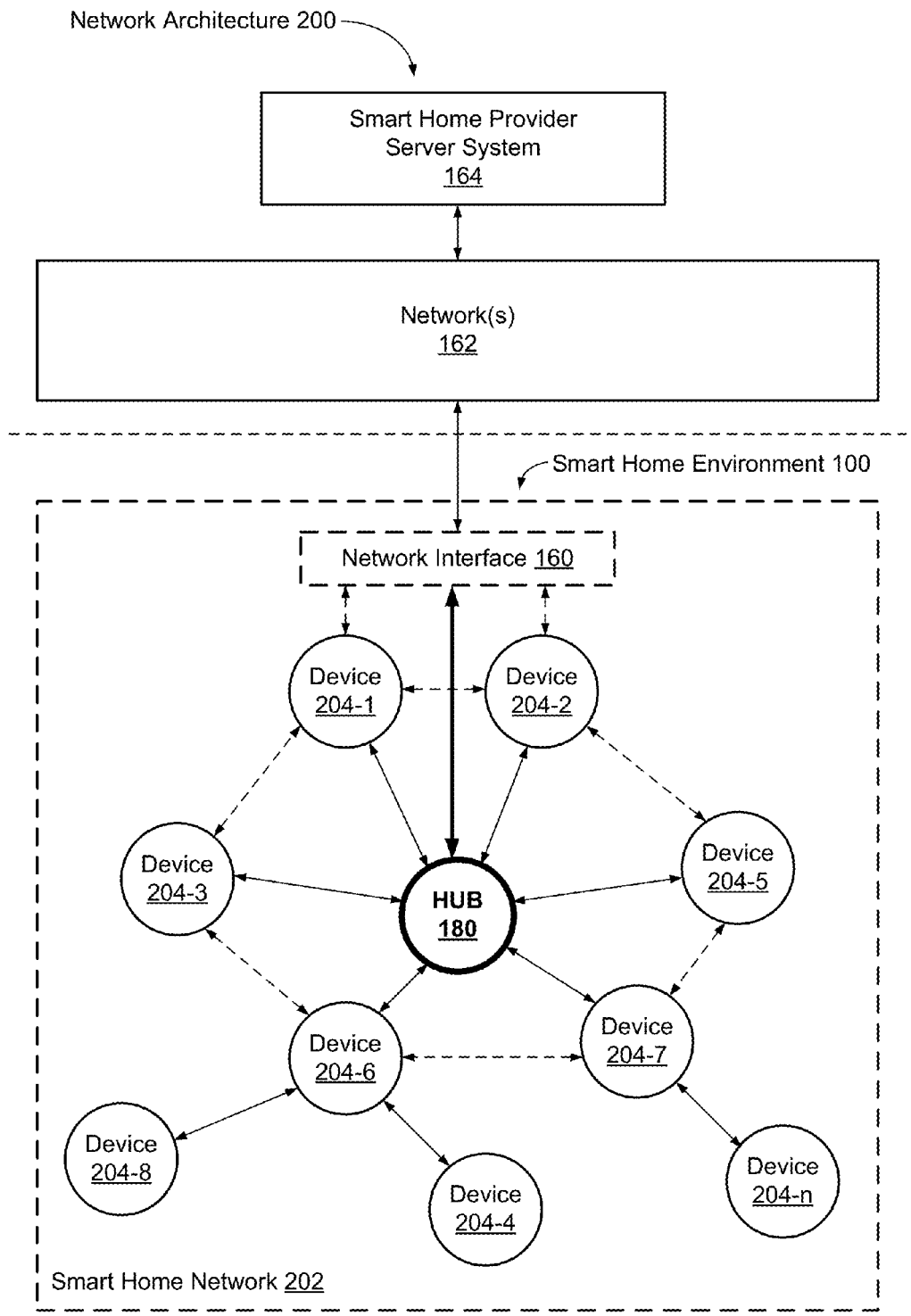
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/ fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
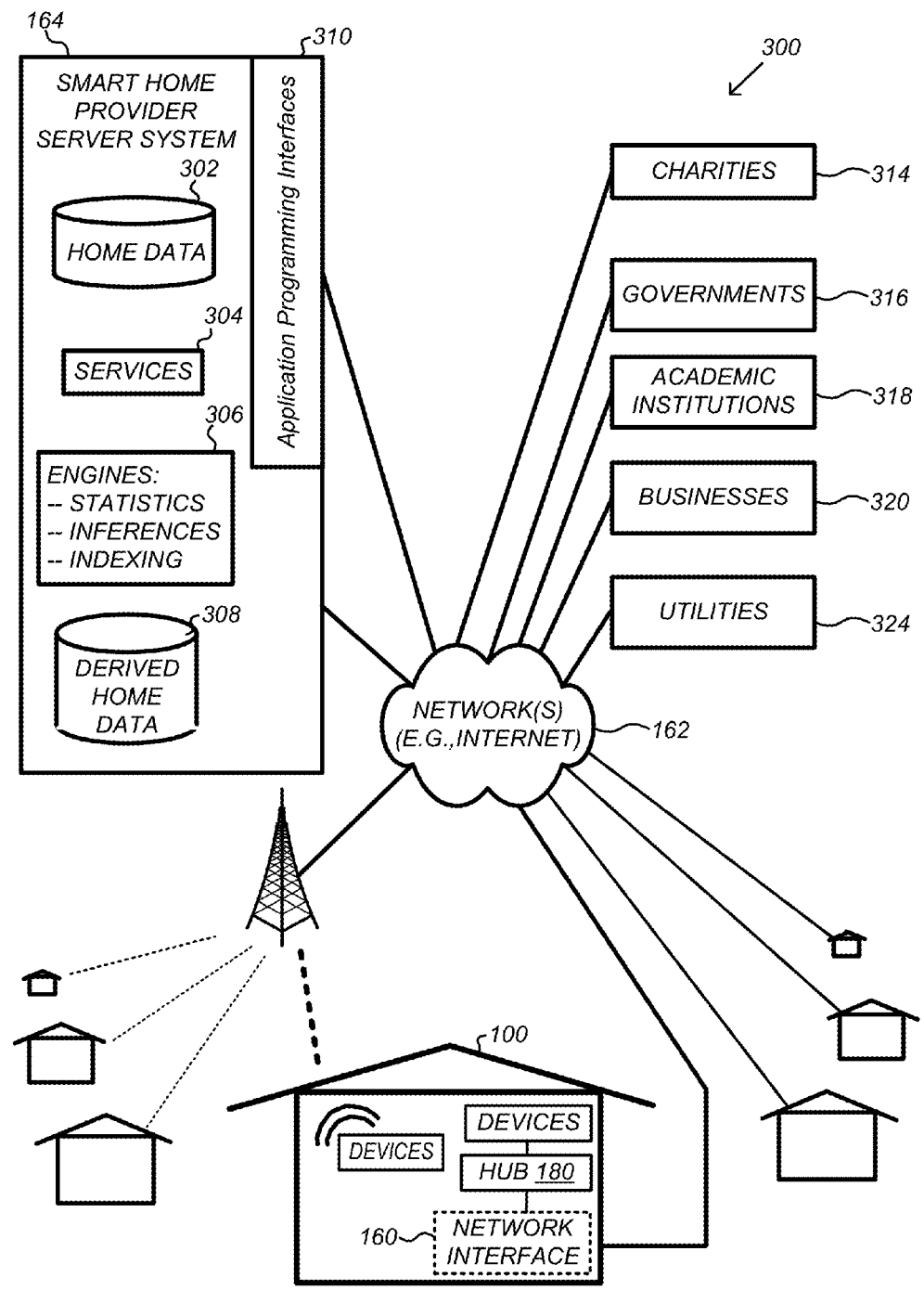
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
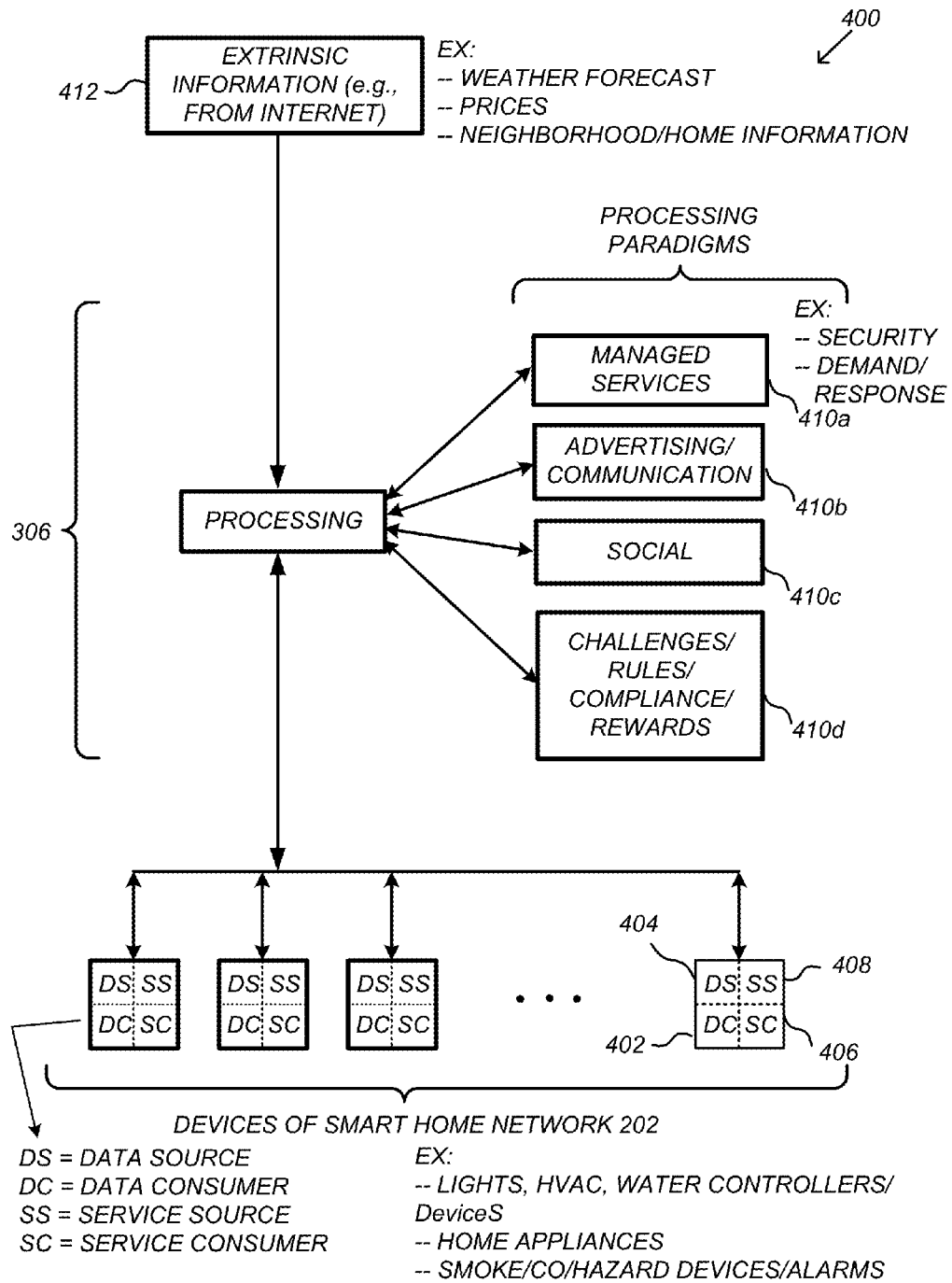
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5A:
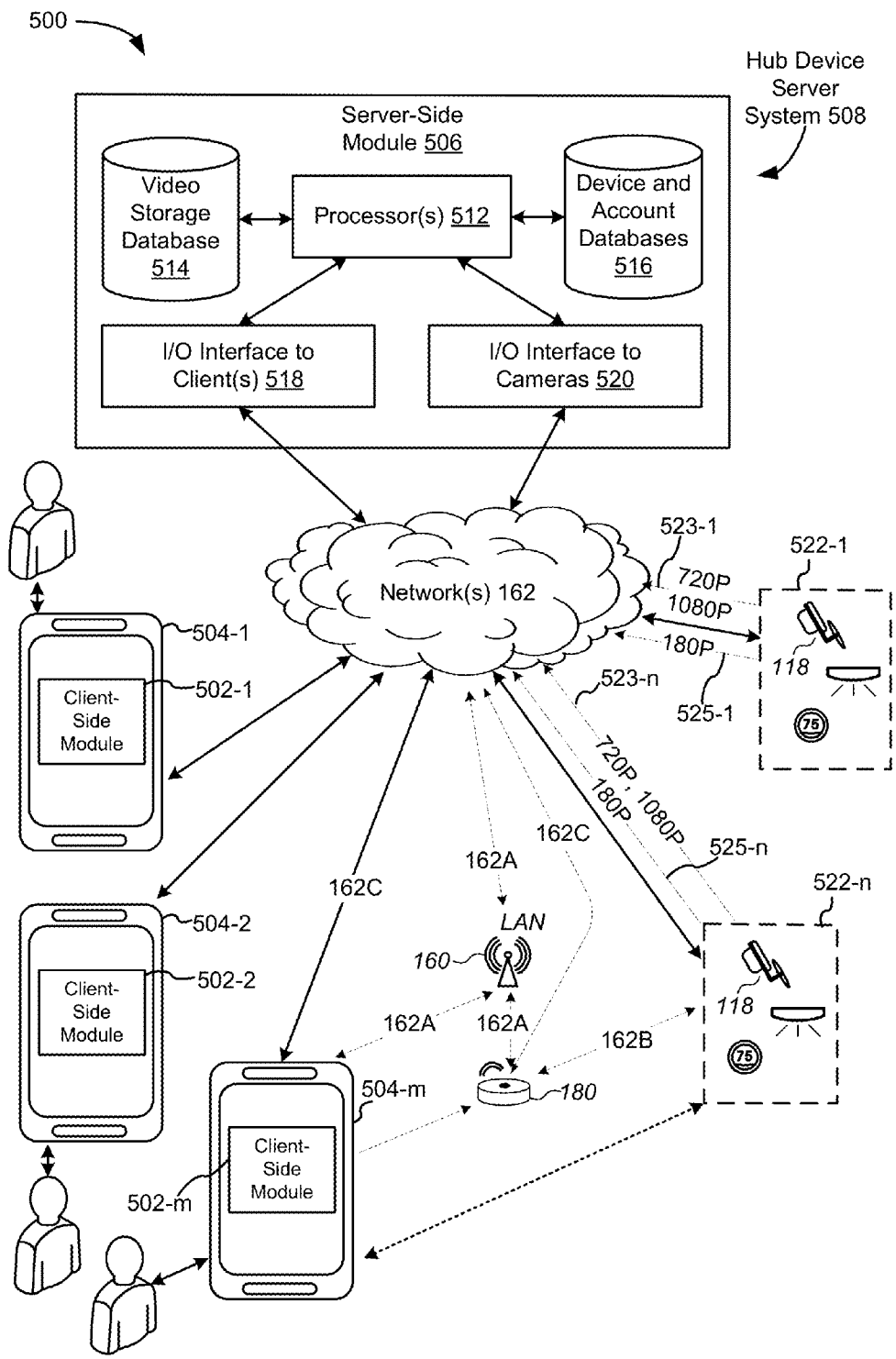
FIG. 5A is a representative operating environment in which a hub device server system interacts with client devices and hub devices communicatively coupled to local smart devices, in accordance with some implementations.

FIG. 5A illustrates a representative operating environment 500 in which a hub device server system 508 provides data processing for monitoring and facilitating review of alert events (e.g., motion events) in video streams captured by video cameras 118. As shown in FIG. 5A, the hub device server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more user (e.g., reviewer) accounts, and the hub device server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the hub device server system 508; the hub device server system 508 is a part or component of the smart home provider server system 164. In some implementations, the hub device server system 508 is a dedicated video processing server that provides video processing services to video sources and client devices 504 independent of other services provided by the hub device server system 508. An example of a video processing server is described below with reference to FIG. 5B.

In some implementations, each of the video sources 522 includes one or more video cameras 118 that capture video and send the captured video to the hub device server system 508 substantially in real-time. In some implementations, each of the video sources 522 optionally includes a controller device (not shown) that serves as an intermediary between the one or more cameras 118 and the hub device server system 508. The controller device receives the video data from the one or more cameras 118, optionally performs some preliminary processing on the video data, and sends the video data to the hub device server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the hub device server system 508.

In some implementations, a camera 118 of a video source 522 captures video at a first resolution (e.g., 720P and/or 1080P) and/or a first frame rate (24 frames per second), and sends the captured video to the hub device server system 508 at both the first resolution (e.g., the original capture resolution(s), the high-quality resolution(s) such as 1080P and/or 720P) and the first frame rate, and at a second, different resolution (e.g., 180P) and/or a second frame rate (e.g., 5 frames per second or 10 frames per second). For example, the camera 118 captures a video 523-1 at 720P and/or 1080P resolution (the camera 118 may capture a video at 1080P and create a downscaled 720P version, or capture at both 720P and 1080P). The video source 522 creates a second (or third), rescaled (and optionally at a different frame rate than the version 523-1) version 525-1 of the captured video at 180P resolution, and transmits both the original captured version 523-1 (i.e., 1080P and/or 720P) and the rescaled version 525-1 (i.e., the 180P version) to the hub device server system 508 for storage. In some implementations, the rescaled version has a lower resolution, and optionally a lower frame rate, than the original captured video. The hub device server system 508 transmits the original captured version or the rescaled version to a client 504, depending on the context. For example, the hub device server system 508 transmits the rescaled version when transmitting multiple videos to the same client device 504 for concurrent monitoring by the user, and transmits the original captured version in other contexts. In some implementations, the hub device server system 508 downscales the original captured version to a lower resolution, and transmits the downscaled version.

In some other implementations, a camera 118 of a video source 522 captures video at a first resolution (e.g., 720P and/or 1080P) and/or a first frame rate, and sends the captured video to the hub device server system 508 at the first resolution (e.g., the original capture resolution(s); the high-quality resolution(s) such as 1080P and/or 720P) and first frame rate for storage. When the hub device server system 508 transmits the video to a client device, the hub device server system 508 may downscale the video to a second, lower resolution (e.g., 180P) and/or second, lower frame rate for the transmission, depending on the context. For example, the hub device server system 508 transmits the downscaled version when transmitting multiple videos to the same client device 504 for concurrent monitoring by the user, and transmits the original captured version in other contexts. In some implementations, the camera 118 operates in two modes, a Day mode in which there is enough ambient light to capture color video of a scene, and a Night mode in which the camera captures video of a scene using onboard LED illumination when there is not enough ambient light (e.g., as described in the cross-referenced U.S. patent application Ser. No. 14/723,276, filed on May 27, 2015, entitled, "Multi-mode LED Illumination System."). As described herein, in some implementations, the camera 118 includes a program module that decides when to switch from Night mode to Day mode using one or more of: illuminant detection (detecting the type of ambient light based on R/G and B/G component ratios of the ambient light), lux detection (detecting the ambient light level), and tiling (performing illuminant detection and/or lux detection for sub-regions of an image sensor array so as to detect localized/point light source that only impact a portion of the image sensor array).

As shown in FIG. 5A, in accordance with some implementations, each of the client devices 504 includes a client-side module 502. The client-side module 502 communicates with a server-side module 506 executed on the hub device server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. In some implementations, the I/O interface to clients 518 or a transcoding proxy computer (not shown) rescales (e.g., downscales) and/or changes the frame rate of video for transmission to a client 504. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

In some implementations, the server-side module 506 receives information regarding alert events detected by other smart devices 204 (e.g., hazards, sound, vibration, motion). In accordance with the alert event information, the server-side module 506 instructs one or more video sources 522 in the smart home environment 100 where the alert event is detected to capture video and/or associate with the alert event video, received from the video sources 522 in the same smart home environment 100, that is contemporaneous or proximate in time with the alert event.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. For example, client devices 504-1, 504-2, and 504-$m$ are a smart phone, a tablet computer, and a laptop computer, respectively.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the hub device server system 508 is implemented on one or more standalone data processing apparatuses or a distributed network of computers. In some implementations, the hub device server system 508 also employs various virtual devices and/or services of third party service providers (e.g., third-party cloud service providers) to provide the underlying computing resources and/or infrastructure resources of the hub device server system 508. In some implementations, the hub device server system 508 includes, but is not limited to, a handheld computer, a tablet computer, a laptop computer, a desktop computer, or a combination of any two or more of these data processing devices or other data processing devices.

The server-client environment 500 shown in FIG. 5A includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the hub device server system 508 can vary in different implementations. For example, in some implementations, client-side module 502 is a thin-client that provides only user-facing input and output processing functions, and delegates all other data processing functionalities to a backend server (e.g., the hub device server system 508). Similarly, in some implementations, a respective one of the video sources 522 is a simple video capturing device that continuously captures and streams video data to the hub device server system 508 with no or limited local preliminary processing on the video data. Although many aspects of the present technology are described from the perspective of the hub device server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the hub device server system 508, the client device 504, and the video sources 522 cooperatively.

It should be understood that operating environment 500 that involves the hub device server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-$m$) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-$n$ exchange data with the hub device 180. Alternatively, in some situations, some of the electronic devices of the video sources 522-$n$ communicate with the network interface device 160 directly via the same sub-network 162A that couples devices 160, 180 and 504-$m$. In some implementations (e.g., in the network 162C), both the client device 504-$m$ and the electronic devices of the video sources 522-$n$ communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-$n$. As explained above, the network interface device 160 and the hub device 180 optionally communicate with each other via a sub-network 162A.

In some implementations, the hub device 180 is omitted, and the functionality of the hub device 180 is performed by the hub device server system 508, video server system 552, or smart home provider server system 164.

Figure 5B:
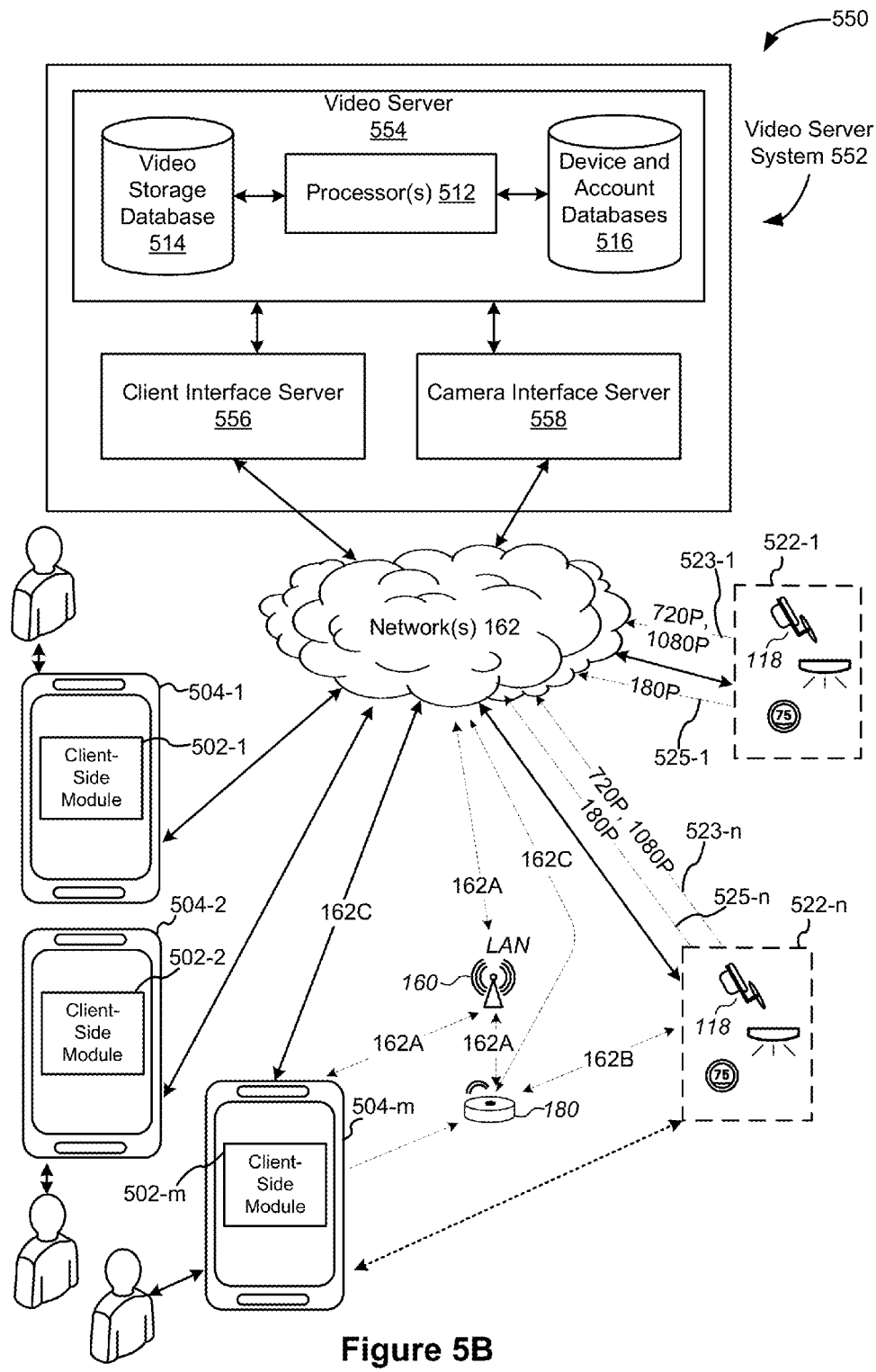
FIG. 5B is a representative operating environment in which a video server system interacts with client devices and hub devices communicatively coupled to local smart devices, in accordance with some implementations.

In some implementations, the hub device server system 508 is, or includes, a dedicated video processing server. FIG. 5B illustrates a representative operating environment 550 in which a video server system 552 serves as a dedicated video processing server and provides data processing for monitoring and facilitating review of alert events (e.g., motion events) in video streams captured by video cameras 118. As shown in FIG. 5B, the video server system 552 receives video data from video sources 522 (including cameras 118) located at various physical locations (e.g., inside homes, restaurants, stores, streets, parking lots, and/or the smart home environments 100 of FIG. 1). Each video source 522 may be bound to one or more user (e.g., reviewer) accounts, and the video server system 552 provides video monitoring data for the video source 522 to client devices 504 associated with the reviewer accounts. For example, the portable electronic device 166 is an example of the client device 504.

In some implementations, the smart home provider server system 164 or a component thereof serves as the video server system 552; the video server system 552 is a part or component of the smart home provider server system 164. In some implementations, the video server system 552 is separate from the smart home provider server system 164, and provides video processing services to video sources 522 and client devices 504 independent of other services provided by the smart home provider server system 164. In some implementations, the smart home provider server system 164 and the video server system 552 are separate but communicate information with each other to provide functionality to users. For example, a detection of a hazard may be communicated by the smart home provider server system 164 to the video server system 552, and the video server system 552, in accordance with the communication regarding the detection of the hazard, records, processes, and/or provides video associated with the detected hazard.

In some implementations, each of the video sources 522 includes one or more video cameras 118 that capture video and send the captured video to the video server system 552 substantially in real-time. In some implementations, each of the video sources 522 optionally includes a controller device (not shown) that serves as an intermediary between the one or more cameras 118 and the video server system 552. The controller device receives the video data from the one or more cameras 118, optionally, performs some preliminary processing on the video data, and sends the video data to the video server system 552 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the video server system 552.

In some implementations, a camera 118 of a video source 522 captures video at a first resolution (e.g., 720P and/or 1080P) and/or a first frame rate (24 frames per second), and sends the captured video to the video server system 552 at both the first resolution (e.g., the original capture resolution(s), the high-quality resolution(s)) and the first frame rate, and a second, different resolution (e.g., 180P) and/or a second frame rate (e.g., 5 frames per second or 10 frames per second). For example, the camera 118 captures a video 523-1 at 720P and/or 1080P resolution (the camera 118 may capture a video at 1080P and create a downscaled 720P version, or capture at both 720P and 1080P). The video source 522 creates a second (or third), rescaled (and optionally at a different frame rate than the version 523-1) version 525-1 of the captured video at 180P resolution, and transmits both the original captured version 523-1 (i.e., 1080P and/or 720P) and the rescaled version 525-1 (i.e., the 180P version) to the video server system 552 for storage. In some implementations, the rescaled version has a lower resolution, and optionally a lower frame rate, than the original captured video. The video server system 552 transmits the original captured version or the rescaled version to a client 504, depending on the context. For example, the video server system 552 transmits the rescaled version when transmitting multiple videos to the same client device 504 for concurrent monitoring by the user, and transmits the original captured version in other contexts. In some implementations, the video server system 552 downscales the original captured version to a lower resolution, and transmits the downscaled version.

In some other implementations, a camera 118 of a video source 522 captures video at a first resolution (e.g., 720P and/or 1080P)) and/or a first frame rate, and sends the captured video to the video server system 552 at the first resolution (e.g., the original capture resolution(s), the high-quality resolution(s) such as 1080P and/or 720P) and the first fame rate for storage. When the video server system 552 transmits the video to a client device, the video server system 552 may downscale the video to a second, lower resolution (e.g., 180P) and/or second, lower frame rate for the transmission, depending on the context. For example, the video server system 552 transmits the downscaled version when transmitting multiple videos to the same client device 504 for concurrent monitoring by the user, and transmits the original captured version in other contexts.

As shown in FIG. 5B, in accordance with some implementations, each of the client devices 504 includes a client-side module 502. The client-side module 502 communicates with the video server system 552 through the one or more networks 162. In some implementations, the video server system 552 includes a video server 552, a client interface server 556, and a camera interface server 558. In some implementations, the video server 552 includes the server-side module 506 and its components and modules (FIG. 5A) or one or more respective components and/or modules of the server-side module 506. The client-side module 502 provides client-side functionalities for the event monitoring and review processing and communications with the video server system 552. The video server system 552 provides server-side functionalities for event monitoring and review processing for any number of client-side modules 502 each residing on a respective client device 504. The video server system 556 also provides server-side functionalities for video processing and camera control for any number of the video sources 522, including any number of control devices and the cameras 118.

In some implementations, the video server 554 includes one or more processors 512, a video storage database 514, and device and account databases 516. In some implementations, the video server system 552 also includes a client interface server 556 and a camera interface server 558. The client interface server 556 provides an I/O interface to one or more client devices 504, and the camera interface server 558 provides an I/O interface to one or more video sources 520. The client interface server 556 facilitates the client-facing input and output processing for the video server system 552. For example, the client interface server 556 generates web pages for reviewing and monitoring video captured by the video sources 522 in a web browser application at a client 504. In some implementations, the client interface server 556 or a transcoding proxy computer rescales (e.g., downscales) and/or changes the frame rate of video for transmission to a client 504. In some implementations, the client interface server 504 also serves as the transcoding proxy. The databases 516 store a plurality of profiles for reviewer accounts registered with the video processing server, where a respective user profile includes account credentials for a respective reviewer account, and one or more video sources linked to the respective reviewer account. The camera interface server 558 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, event masks, alert events, and camera histories, for use in data processing for event monitoring and review for each reviewer account.

In some implementations, the video server system 552 receives information regarding alert events detected by other smart devices 204 (e.g., hazards, sound, vibration, motion. In accordance with the alert event information, the video server system 552 instructs one or more video sources 522 in the smart home environment 100 where the alert event is detected to capture video and/or associate with the alert event video, received from the video sources 522 in the same smart home environment 100, that is contemporaneous or proximate in time with the alert event.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. For example, client devices 504-1, 504-2, and 504-m are a smart phone, a tablet computer, and a laptop computer, respectively.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the video server system 552 is implemented on one or more standalone data processing apparatuses or a distributed network of computers. In some implementations, the video server 554, the client interface server 556, and the camera interface server 558 are each respectively implemented on one or more standalone data processing apparatuses or a distributed network of computers. In some implementations, the video server system 552 also employs various virtual devices and/or services of third party service providers (e.g., third-party cloud service providers) to provide the underlying computing resources and/or infrastructure resources of the video server system 552. In some implementations, the video server system 552 includes, but is not limited to, a handheld computer, a tablet computer, a laptop computer, a desktop computer, or a combination of any two or more of these data processing devices or other data processing devices.

The server-client environment 550 shown in FIG. 5B includes both a client-side portion (e.g., the client-side module 502) and a server-side portion (e.g., the components and modules in the video server system 552). The division of functionalities between the client and server portions of operating environment 550 can vary in different implementations. Similarly, the division of functionalities between the video source 522 and the video server system 552 can vary in different implementations. For example, in some implementations, client-side module 502 is a thin-client that provides only user-facing input and output processing functions, and delegates all other data processing functionalities to a backend server (e.g., the video server system 552). Similarly, in some implementations, a respective one of the video sources 522 is a simple video capturing device that continuously captures and streams video data to the video server system 552 with no or limited local preliminary processing on the video data. Although many aspects of the present technology are described from the perspective of the video server system 552, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the video server system 552, the client device 504, and the video sources 522 cooperatively.

It should be understood that operating environment 550 that involves the video server system 552, the video sources 522 and the video cameras 118 is merely an example. Many aspects of operating environment 550 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-n exchange data with the hub device 180. Alternatively, in some situations, some of the electronic devices of the video sources 522-n communicate with the network interface device 160 directly via the same sub-network 162A that couples devices 160, 180 and 504-m. In some implementations (e.g., in the network 162C), both the client device 504-m and the electronic devices of the video sources 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-n. As explained above, the network interface device 160 and the hub device 180 optionally communicate with each other via a sub-network 162A.

In some implementations, a video source 522 may be private (e.g., its captured videos and history are accessible only to the associated user/account), public (e.g., its captured videos and history are accessible by anyone), or shared (e.g., its captured videos and history are accessible only to the associated user/account and other specific users/accounts with whom the associated user has authorized access (e.g., by sharing with the other specific users)). Whether a video source 522 is private, public, or shared is configurable by the associated user.

In some implementations, the camera 118 also performs preliminary motion detection on video captured by the camera 118. For example, the camera 118 analyzes the captured video for significant changes in pixels. When motion is detected by the preliminary motion detection, the camera 118 transmits information to the hub device server system 508 or video server system 552 informing the server system of the preliminary detected motion. The hub device server system 508 or video server system 552, in accordance with the information of the detected motion, may activate sending of a motion detection notification to a client device 504, log the preliminary detected motion as an alert event, and/or perform additional analysis of the captured video to confirm and/or classify the preliminary detected motion.

Figure 6:
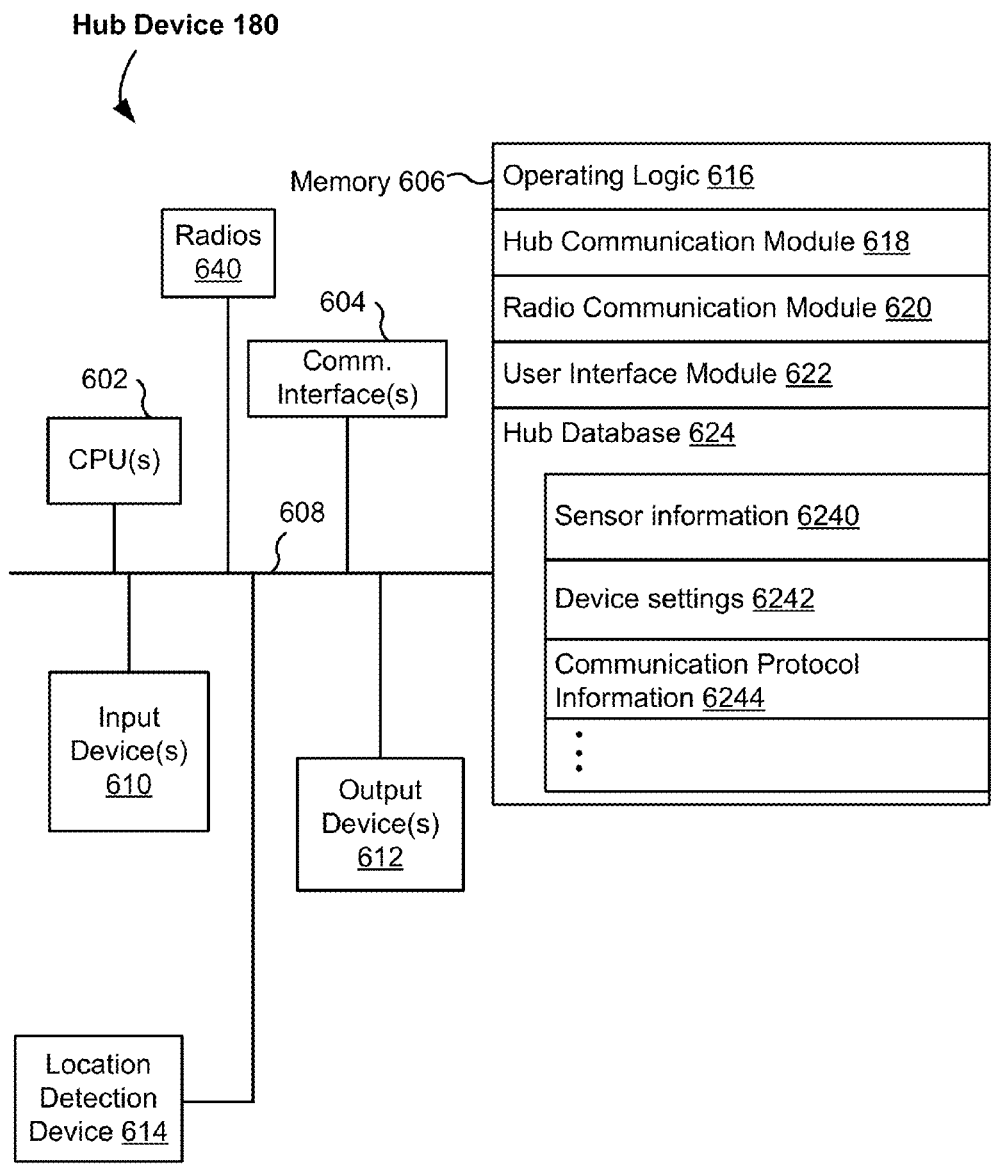
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 640 enables one or more radio communication networks in the smart home environments, and allows a hub device to communicate with smart devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating logic 616 including procedures for handling various basic system services and for performing hardware dependent tasks;
- Hub device communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);
- Radio Communication Module 620 for connecting the hub device 180 to other devices (e.g., controller devices, smart devices 204 in smart home environment 100, client devices 504) via one or more radio communication devices (e.g., radios 640);
- User interface module 622 for providing and displaying a user interface in which settings, captured data, and/or other data for one or more devices (e.g., smart devices 204 in smart home environment 100) can be configured and/or viewed; and
- Hub device database 624, including but not limited to:
    - Sensor information 6240 for storing and managing data received, detected, and/or transmitted by one or more sensors of the hub device 180 and/or one or more other devices (e.g., smart devices 204 in smart home environment 100);
    - Device settings 6242 for storing operational settings for one or more devices (e.g., coupled smart devices 204 in smart home environment 100); and
    - Communication protocol information 6244 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7A:
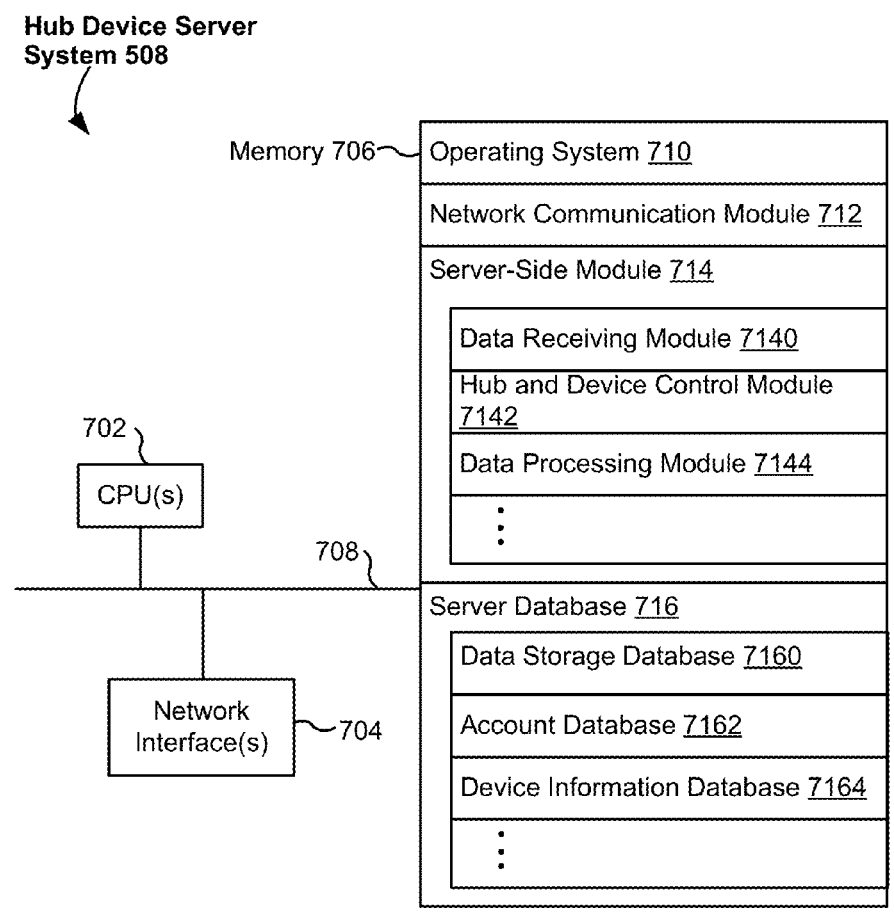
FIG. 7A is a block diagram illustrating a representative hub device server system, in accordance with some implementations.

FIG. 7A is a block diagram illustrating the hub device server system 508 in accordance with some implementations. The hub device server system 508, typically, includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

- Operating system 710 including procedures for handling various basic system services and for performing hardware dependent tasks;
- Network communication module 712 for connecting the hub device server system 508 to other systems and devices (e.g., client devices, electronic devices, and systems connected to one or more networks 162, FIGS. 1-5B) via one or more network interfaces 704 (wired or wireless);
- Server-side module 714, which provides server-side functionalities for device control, data processing and data review, including but not limited to:
  - Data receiving module 7140 for receiving data from electronic devices (e.g., video data from a camera 118, FIG. 1) via the hub device 180, and preparing the received data for further processing and storage in the data storage database 7160;
  - Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;
  - Data processing module 7144 for processing the data provided by the electronic devices, and/or preparing and sending processed data to a device for review (e.g., client devices 504 for review by a user); and
- Server database 716, including but not limited to:
  - Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;
  - Account database 7162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and
  - Device Information Database 7164 for storing device information related to one or more hub devices, e.g., device identifiers and hub device specific secrets, independently of whether the corresponding hub devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 7B:
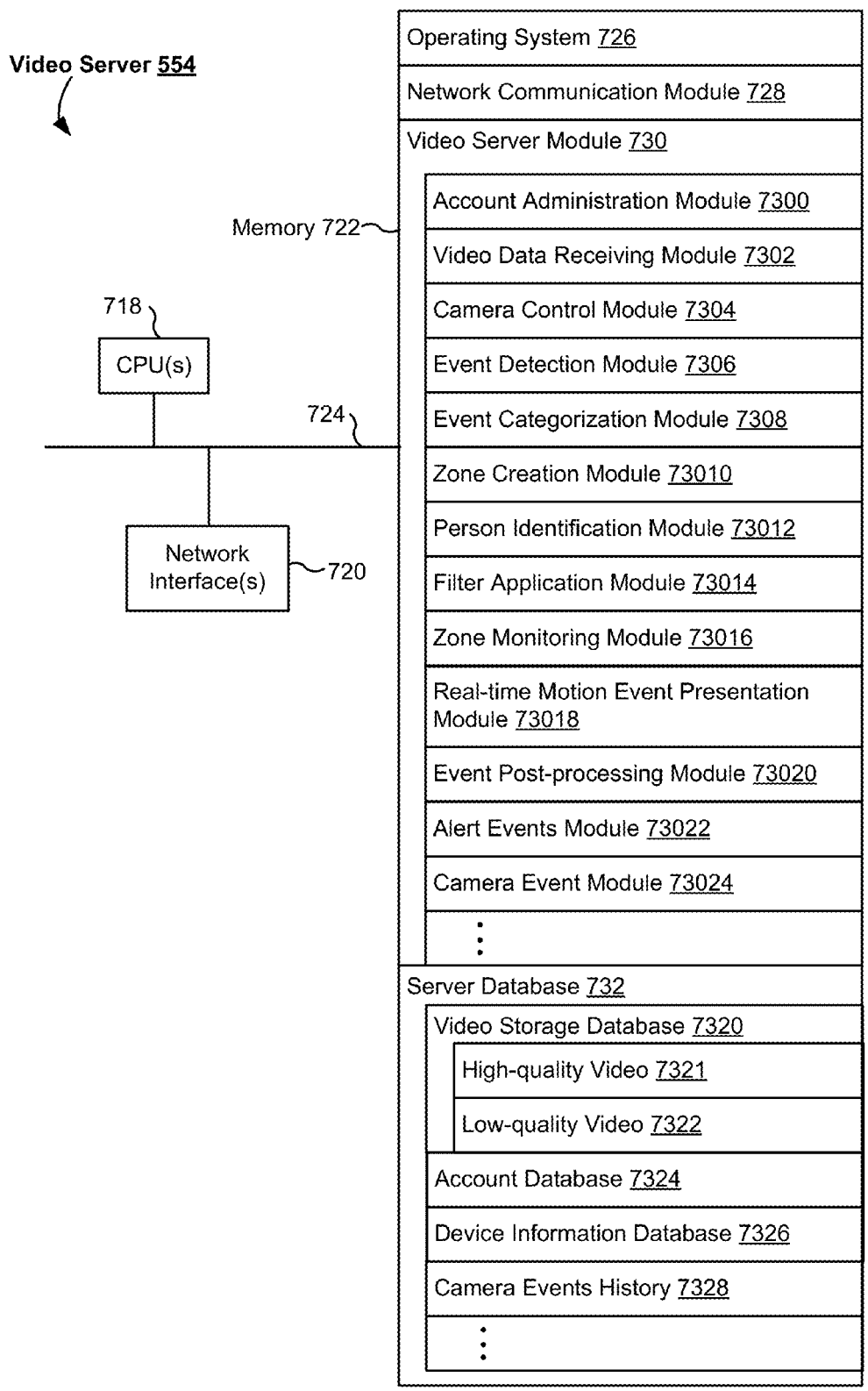
FIG. 7B is a block diagram illustrating a representative video server system, in accordance with some implementations.

FIG. 7B is a block diagram illustrating the video server 554 in accordance with some implementations. The video server 554, typically, includes one or more processing units (CPUs) 718, one or more network interfaces 720, memory 722, and one or more communication buses 724 for interconnecting these components (sometimes called a chipset). Memory 722 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 722, optionally, includes one or more storage devices remotely located from one or more processing units 718. Memory 722, or alternatively the non-volatile memory within memory 722, includes a non-transitory computer readable storage medium. In some implementations, memory 722, or the non-transitory computer readable storage medium of memory 722, stores the following programs, modules, and data structures, or a subset or superset thereof:

- Operating system 726 including procedures for handling various basic system services and for performing hardware dependent tasks;
- Network communication module 728 for connecting the video server 554 to other systems and devices (e.g., client devices, electronic devices, and systems connected to one or more networks 162, FIGS. 1-5B) via one or more network interfaces 720 (wired or wireless);
- Video server module 730, which provides server-side data processing and functionalities for video and event monitoring and review, including but not limited to:
  - Account administration module 7300 for creating reviewer accounts, performing camera registration processing to establish associations between video sources to their respective reviewer accounts, and providing account login-services to the client devices 504;

Video data receiving module 7302 for receiving raw video data from the video sources 522, and preparing the received video data for event processing and long-term storage in the video storage database 514;

Camera control module 7304 for generating and sending server-initiated control commands to modify the operation modes of the video sources, and/or receiving and forwarding user-initiated control commands to modify the operation modes of the video sources 522;

Event detection module 7306 for detecting motion event candidates in video streams from each of the video sources 522, including motion track identification, false positive suppression, and event mask generation and caching;

Event categorization module 7308 for categorizing motion events detected in received video streams;

Zone creation module 73010 for generating zones of interest in accordance with user input;

Person identification module 73012 for identifying characteristics associated with presence of humans in the received video streams;

Filter application module 73014 for selecting event filters (e.g., event categories, zones of interest, a human filter, etc.) and applying the selected event filter to past and new motion events detected in the video streams;

Zone monitoring module 73016 for monitoring motions within selected zones of interest and generating notifications for new motion events detected within the selected zones of interest, where the zone monitoring takes into account changes in surrounding context of the zones and is not confined within the selected zones of interest;

Real-time motion event presentation module 73018 for dynamically changing characteristics of event indicators displayed in user interfaces as new event filters, such as new event categories or new zones of interest, are created, and for providing real-time notifications as new motion events are detected in the video streams; and Event post-processing module 3020 for providing summary time-lapse for past motion events detected in video streams, and providing event and category editing functions to user for revising past event categorization results;

Alert events module 73022 for receiving information on alert events (e.g., detected hazards, detected sounds, etc.), instructing cameras 118 to capture video in accordance with alert event information, and determining chronologies of alert events; and Camera events module 73024 for associating captured video with alert events, from the same smart home environment 100, that are proximate or contemporaneous in time, and logging camera histories of camera events; and Server database 732, including but not limited to:

Video storage database 7320 storing raw video data associated with each of the video sources 522 (each including one or more cameras 118) of each reviewer account, as well as event categorization models (e.g., event clusters, categorization criteria, etc.), event categorization results (e.g., recognized event categories, and assignment of past motion events to the recognized event categories, representative events for each recognized event category, etc.), event masks for past motion events, video segments for each past motion event, preview video (e.g., sprites) of past motion events, and other relevant metadata (e.g., names of event categories, location of the cameras 118, creation time, duration, etc.) associated with the motion events;

Account database 7324 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;

Device Information Database 7326 for storing device information related to one or more hub devices, e.g., device identifiers and hub device specific secrets, independently of whether the corresponding hub devices have been associated with any user account; and Camera events history 7328 for storing per-camera histories of camera events, including alert events, chronologies of alert events, and references to associated videos in the video storage database 7320.

Video data stored in the video storage database 7320 includes high-quality versions 7321 and low-quality versions 7322 of videos associated with each of the video sources 522. High-quality video 7321 includes video in relatively high resolutions (e.g., 720P and/or 1080P) and relatively high frame rates (e.g., 24 frames per second). Low-quality video 7322 includes video in relatively low resolutions (e.g., 180P) and relatively low frame rates (e.g., 5 frames per second, 10 frames per second).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 722, optionally, stores a subset of the modules and data structures identified above. Furthermore, memory 722, optionally, stores additional modules and data structures not described above.

Figure 7C:
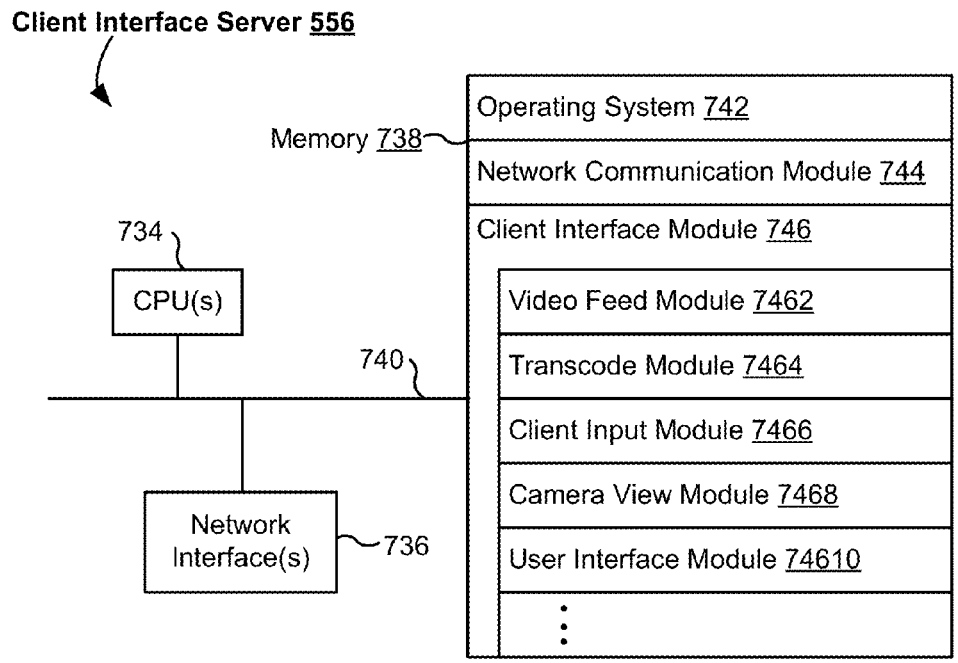
FIG. 7C is a block diagram illustrating a representative client interface server, in accordance with some implementations.

FIG. 7C is a block diagram illustrating the client interface server 556 in accordance with some implementations. The client interface server 556, typically, includes one or more processing units (CPUs) 734, one or more network interfaces 736, memory 738, and one or more communication buses 740 for interconnecting these components (sometimes called a chipset). Memory 738 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 738, optionally, includes one or more storage devices remotely located from one or more processing units 734. Memory 738, or alternatively the non-volatile memory within memory 738, includes a non-transitory computer readable storage medium. In some implementations, memory 738, or the non-transitory computer readable storage medium of memory 738, stores the following programs, modules, and data structures, or a subset or superset thereof:

Operating system 742 including procedures for handling various basic system services and for performing hardware dependent tasks;

Network communication module 744 for connecting the client interface server 556 to other systems and devices (e.g., client devices, video server 554, and systems connected to one or more networks 162, FIGS. 1-5B) via one or more network interfaces 740 (wired or wireless);

Client interface module 746, which provides an I/O interface between client devices 504 and the video server 554, including but not limited to:

Video feed module 7462 for transmitting videos from the video server system, or images extracted from same videos, to client devices as video streams or periodically refreshed images, and optionally transmitting particular views of videos or images from videos;

Transcode module 7464 for rescaling (e.g., downscaling from 720P to 180P) video for transmission to client devices 504;

Client input module 7466 for receiving and processing input commands from client devices (e.g., client device 504) 504 to change the video view being transmitted or controlling a video source 522;

Camera view module 7468 for determining which views of videos or images from videos are to be transmitted to client devices; and User interface module 74610 for generating user interfaces (e.g., web pages), transmitted to client devices 504, for viewing video feeds and corresponding event histories.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 738, optionally, stores a subset of the modules and data structures identified above. Furthermore, memory 738, optionally, stores additional modules and data structures not described above.

Figure 7D:
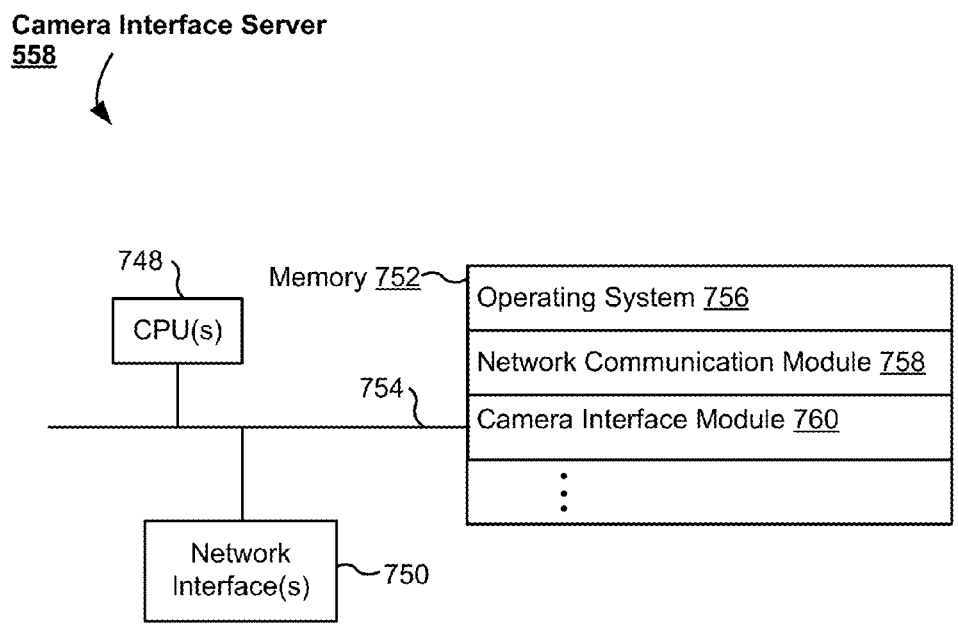
FIG. 7D is a block diagram illustrating a representative camera interface server, in accordance with some implementations.

FIG. 7D is a block diagram illustrating the camera interface server 558 in accordance with some implementations. The camera interface server 558, typically, includes one or more processing units (CPUs) 748, one or more network interfaces 750, memory 752, and one or more communication buses 754 for interconnecting these components (sometimes called a chipset). Memory 752 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 752, optionally, includes one or more storage devices remotely located from one or more processing units 748. Memory 752, or alternatively the non-volatile memory within memory 752, includes a non-transitory computer readable storage medium. In some implementations, memory 752, or the non-transitory computer readable storage medium of memory 752, stores the following programs, modules, and data structures, or a subset or superset thereof:

Operating system 756 including procedures for handling various basic system services and for performing hardware dependent tasks;

Network communication module 758 for connecting the camera interface server 558 to other systems and devices (e.g., client devices, video server 554, and systems connected to one or more networks 162, FIGS. 1-5B) via one or more network interfaces 754 (wired or wireless); and Camera interface module 760 for providing an I/O interface between video sources 522 and the video server 554.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 752, optionally, stores a subset of the modules and data structures identified above. Furthermore, memory 752, optionally, stores additional modules and data structures not described above.

In some implementations, at least some of the functions of the video server 554, client interface server 556, and camera interface server 558 are performed by the hub device server system 508, and the corresponding modules and sub-modules of these functions may be included in the hub device server system 508. In some implementations, at least some of the functions of the hub device server system 508 are performed by the video server 554, client interface server 556, and/or camera interface server 558, and the corresponding modules and sub-modules of these functions may be included in the video server 554, client interface server 556, and/or camera interface server 558.

Figure 8A:
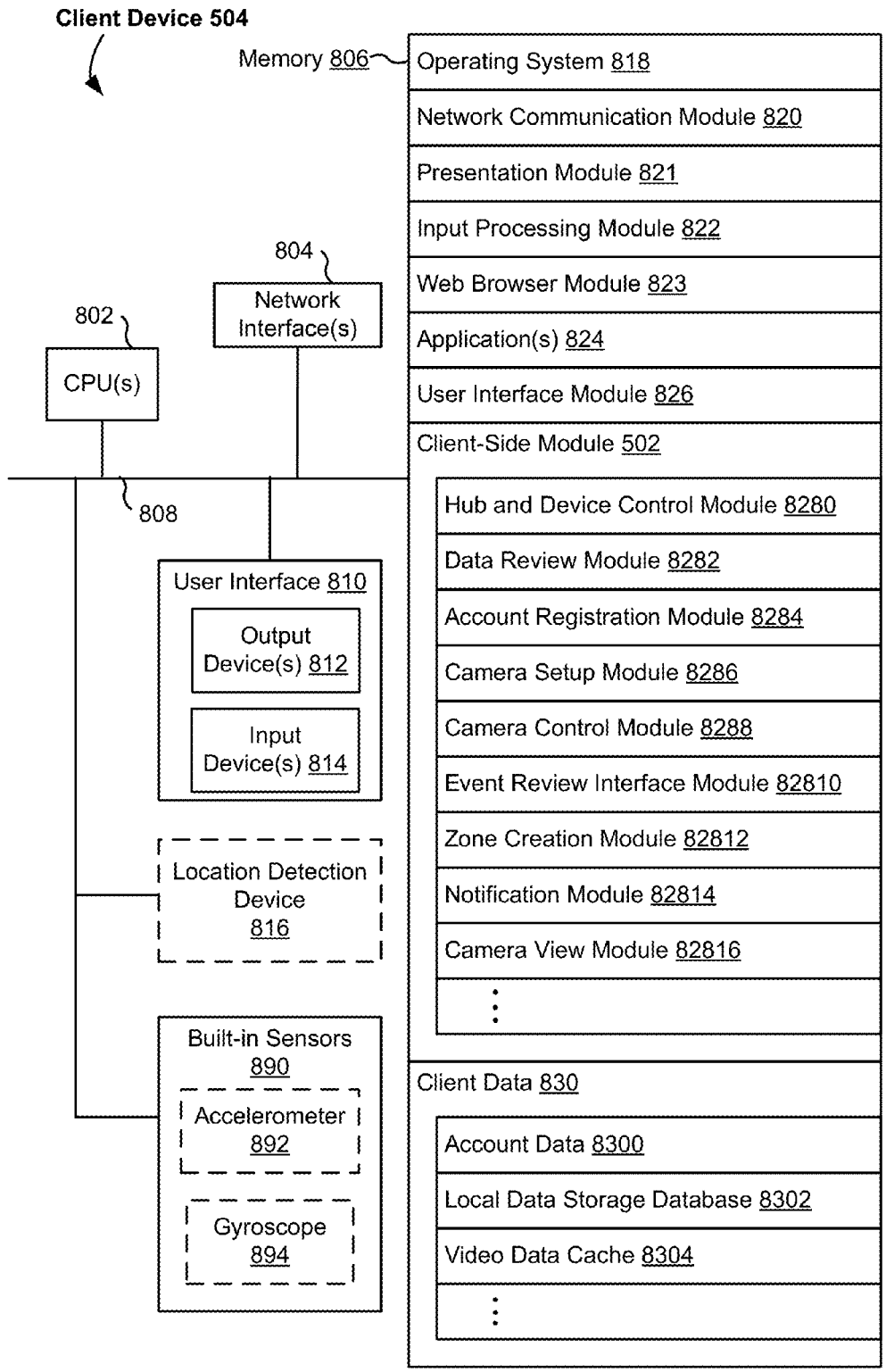
FIG. 8A-8B are block diagrams illustrating a representative client device associated with a user account, in accordance with some implementations.
Figure 8B:
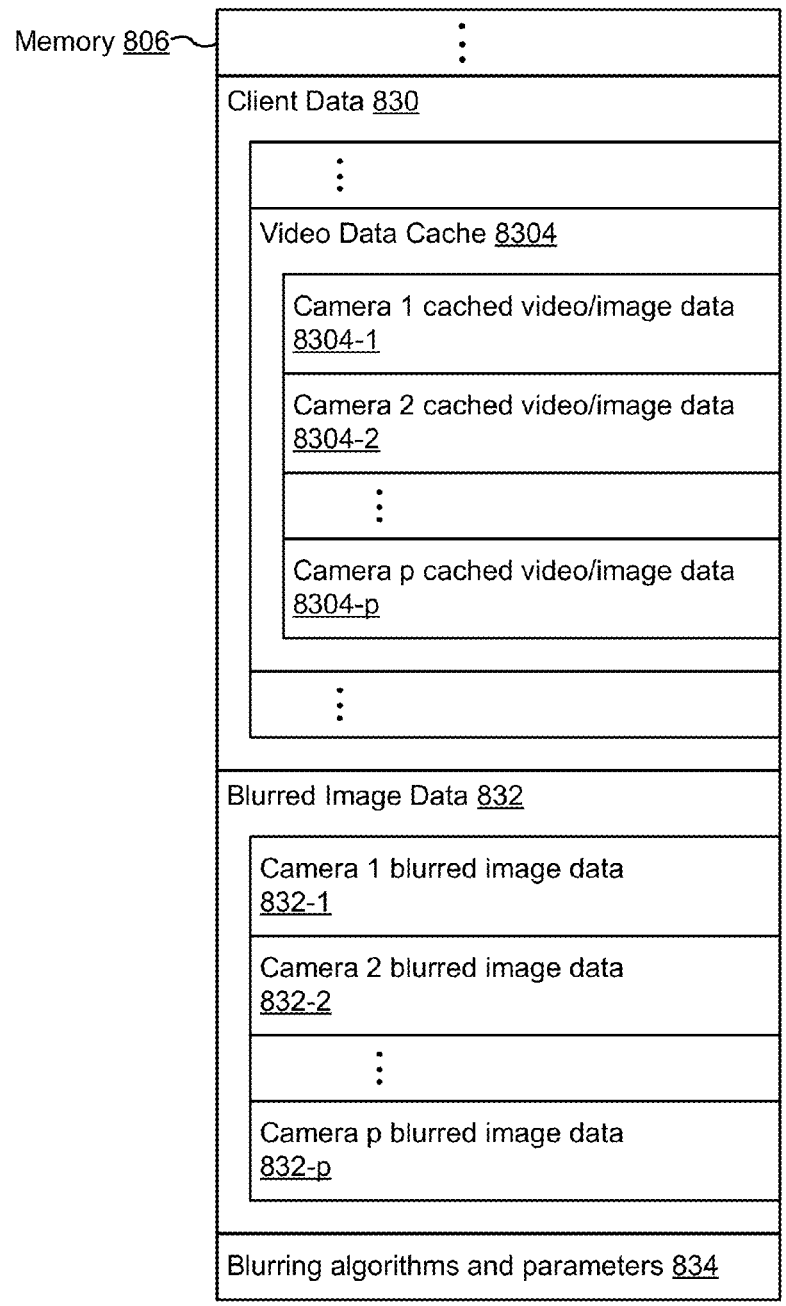

FIGS. 8A-8B are block diagrams illustrating a representative client device 504 associated with a user (e.g., reviewer) account in accordance with some implementations. The client device 504, typically, includes one or more processing units (CPUs) 802, one or more network interfaces 804, memory 806, and one or more communication buses 808 for interconnecting these components (sometimes called a chipset). The client device also includes a user interface 810 and one or more built-in sensors 890 (e.g., accelerometer 892 and gyroscope 894). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, the client device 504 optionally uses a microphone and voice recognition or a camera and gesture recognition to supplement or replace the keyboard. Further, the client device 504 optionally uses the accelerometer to detect changes in the orientation of the client device 504, and in particular applications and contexts interpret the change in orientation detected by the accelerometer as user input. In some implementations, the client device 504 includes one or more cameras, scanners, or photo sensor units for capturing images (not shown). In some implementations, the client device 504 optionally includes a location detection device 816, such as a GPS (global positioning satellite) or other geo-location receiver, for determining the location of the client device 504.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

- Operating system 818 including procedures for handling various basic system services and for performing hardware dependent tasks;
- Network communication module 820 for connecting the client device 504 to other systems and devices (e.g., hub device server system 508, video server system 552, video sources 522) connected to one or more networks 162 via one or more network interfaces 804 (wired or wireless);
- Presentation module 821 for enabling presentation of information (e.g., user interfaces for application(s) 824 and web browser module 823 or the client-side module 502, widgets, websites and web pages thereof, and/or games, audio and/or video content, text, etc.) at the client device 504 via the one or more output devices 812 (e.g., displays, speakers, etc.) associated with the user interface 810;
- Input processing module 822 for detecting one or more user inputs or interactions from one of the one or more input devices 814 and optionally the accelerometer 892 and interpreting the detected input or interaction;
- Web browser module 823 for navigating, requesting (e.g., via HTTP), and displaying websites and web pages thereof, including a web interface for logging into a reviewer account, controlling the video sources associated with the reviewer account, establishing and selecting event filters, and editing and reviewing motion events detected in the video streams of the video sources;
- One or more applications 824 for execution by the client device 504 (e.g., games, social network applications, smart home applications, and/or other web or non-web based applications), for controlling devices (e.g., sending commands, configuring settings, etc. to hub devices and/or other client or electronic devices), and for reviewing data captured by the devices (e.g., device status and settings, captured data, or other information regarding the hub device or other connected devices);
- User interface module 826 for providing and displaying a user interface in which settings, captured data, and/or other data for one or more devices (e.g., smart devices 204 in smart home environment 100) can be configured and/or viewed;
- Client-side module 502, which provides client-side data processing and functionalities for device control, data processing, data review, and monitoring and reviewing videos from one or more video sources and camera events, including but not limited to:
  - Hub device and device control module 8280 for generating control commands for modifying an operating mode of the hub device or the electronic devices in accordance with user inputs; and
  - Data review module 8282 for providing user interfaces for reviewing data processed by the hub device server system 508 or video server system 552;
  - Account registration module 8284 for establishing a reviewer account and registering one or more video sources with the hub device server system 508 or video server system 552;
  - Camera setup module 8286 for setting up one or more video sources within a local area network, and enabling the one or more video sources to access the hub device server system 508 or video server system 552 on the Internet through the local area network;
  - Camera control module 8288 for generating control commands for modifying an operating mode of the one or more video sources in accordance with user input;
  - Event review interface module 82810 for providing user interfaces for reviewing event timelines, camera histories with camera events, editing event categorization results, selecting event filters, presenting real-time filtered motion events based on existing and newly created event filters (e.g., event categories, zones of interest, a human filter, etc.), presenting real-time notifications (e.g., pop-ups) for newly detected motion events, and presenting smart time-lapse of selected motion events;
  - Zone creation module 82814 for providing a user interface for creating zones of interest for each video stream in accordance with user input, and sending the definitions of the zones of interest to the hub device server system 508 or video server system 552;
  - Notification module 82814 for generating real-time notifications for all or selected alert events or motion events on the client device 504 outside of the event review user interface; and
  - Camera view module 82816 for generating control commands for modifying a view of a video transmitted to the client device 504 in accordance with user input; and
- Client data 830 storing data associated with the user account, electronic devices, and video sources 522, including, but is not limited to:
  - Account data 8300 storing information related to both user accounts loaded on the client device 504 and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.,
  - Local data storage database 8302 for selectively storing raw or processed data associated with electronic devices (e.g., of the video sources 522, such as a camera 118); and Video data cache 8304 for caching video and image data from video feeds;

Blurred image data 832; and

Blurring algorithms and parameters 834; for generating blurred image data 832 from video/image data in video data cache 8304.

Video data cache 8304 includes cached video/image data for respective cameras associated with a user of the client device 804. For example, as shown in FIG. 8B, the video data cache 8304 includes cached video/image data 8304-1 for a first camera, cached video/image data 8304-2 for a second camera, up to cached video/image data 8304-*p* for a p-th camera. At a given moment, video data cache 8304 may not have cached video/image data for a given camera (e.g., due to the camera being newly associated with the user, due to the cache being cleared, due to the cached video/image data being expired and removed from the cache).

Blurred image data 832 includes sets of progressively blurred images for respective cameras. For example, as shown in FIG. 8B, the blurred image data 832 includes blurred image data (e.g., a set of progressively blurred images) 832-1 for the first camera, blurred image data 832-2 for the second camera, up to blurred image data 832-*p* for the p-th camera.

In some implementations, the client device 504 caches camera history as well as video data 8304. For example, whenever the client device 504 receives camera events history 7328 data from the video server 554, the most recent camera events history (e.g., history from the past two hours, the most recent 20 events) is cached at the client device (e.g., in client data 830). This cached history data may be accessed for quick display of camera history information (e.g., in user interface 1304 (FIG. 13A)).

In some implementations, the client-side module 502 and user interface module 826 are parts, modules, or components of a particular application 824 (e.g., a smart home management application).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

In some implementations, at least some of the functions of the hub device server system 508 or the video server system 552 are performed by the client device 504, and the corresponding sub-modules of these functions may be located within the client device 504 rather than the hub device server system 508 or video server system 552. In some implementations, at least some of the functions of the client device 504 are performed by the hub device server system 508 or video server system 552, and the corresponding sub-modules of these functions may be located within the hub device server system 508 or video server system 552 rather than the client device 504. The client device 504 and the hub device server system 508 or video server system 552 shown in FIGS. 7A-8, respectively, are merely illustrative, and different configurations of the modules for implementing the functions described herein are possible in various implementations.

Figure 9A:
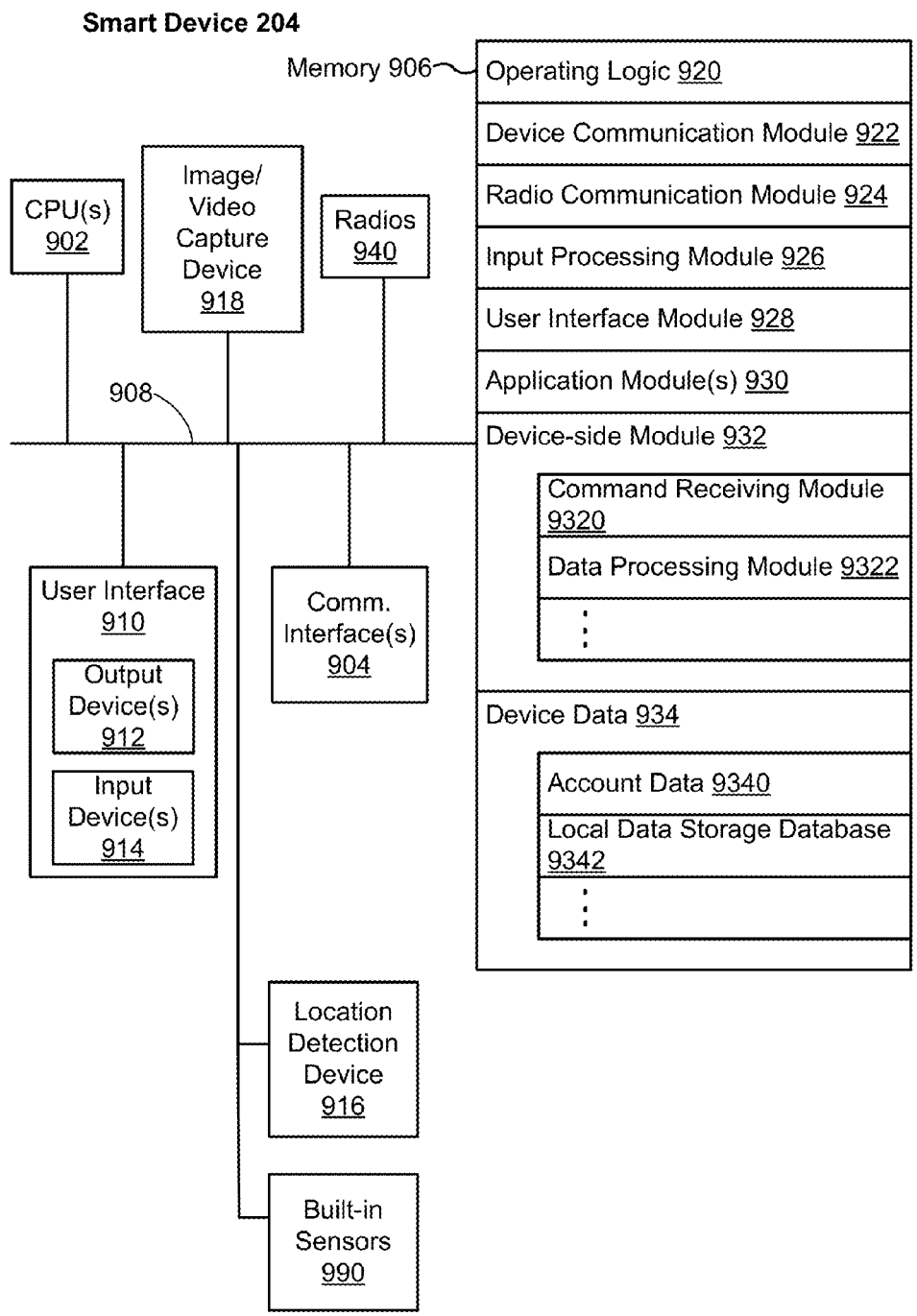
FIG. 9A is a block diagram illustrating a representative smart device, in accordance with some implementations.

FIG. 9A is a block diagram illustrating a representative smart device 204 in accordance with some implementations. In some implementations, the smart device 204 (e.g., any devices of a smart home environment 100, FIGS. 1 and 2) includes one or more processing units (e.g., CPUs, ASICs, FPGAs, microprocessors, and the like) 902, one or more communication interfaces 904, memory 906, radios 940, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 940 enable one or more radio communication networks in the smart home environments, and allow a smart device 204 to communicate with other devices. In some implementations, the radios 940 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 904 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

Operating logic 920 including procedures for handling various basic system services and for performing hardware dependent tasks;

Device communication module 922 for connecting to and communicating with other network devices (e.g., network interface 160, such as a router that provides Internet connectivity, networked storage devices, network routing devices, server system 508, etc.) connected to one or more networks 162 via one or more communication interfaces 904 (wired or wireless);

Radio Communication Module 924 for connecting the smart device 204 to other devices (e.g., controller devices, smart devices 204 in smart home environment 100, client devices 504) via one or more radio communication devices (e.g., radios 940)

Input processing module 926 for detecting one or more user inputs or interactions from the one or more input devices 914 and interpreting the detected inputs or interactions;

User interface module 928 for providing and displaying a user interface in which settings, captured data, and/or other data for one or more devices (e.g., the smart device 204, and/or other devices in smart home environment 100) can be configured and/or viewed;

One or more applications 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);

Device-side module 932, which provides device-side functionalities for device control, data processing and data review, including but not limited to:

Command receiving module 9320 for receiving, forwarding, and/or executing instructions and control commands (e.g., from a client device 504, from a smart home provider server system 164, from user inputs detected on the user interface 910, etc.) for operating the smart device 204;

Data processing module 9322 for processing data captured or received by one or more inputs (e.g., input devices 914, image/video capture devices 918, location detection device 916), sensors (e.g., built-in sensors 990), interfaces (e.g., communication interfaces 904, radios 940), and/or other components of the smart device 204, and for preparing and sending processed data to a device for review (e.g., client devices 504 for review by a user); and Device data 934 storing data associated with devices (e.g., the smart device 204), including, but is not limited to:

Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and Local data storage database 9342 for selectively storing raw or processed data associated with the smart device 204 (e.g., video surveillance footage captured by a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

Figure 9B:
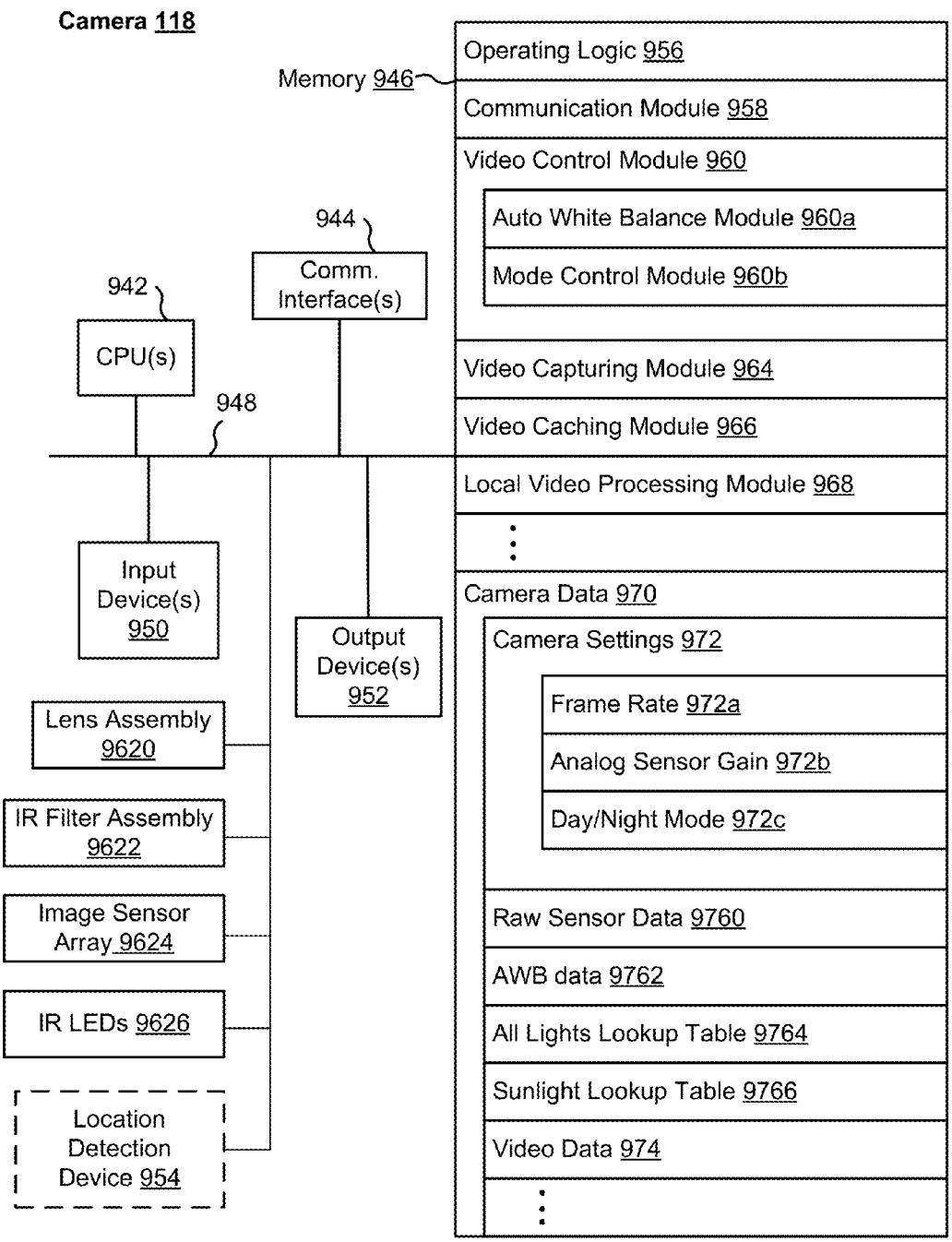
FIG. 9B is a block diagram illustrating a representative video capturing device (e.g., a camera), in accordance with some implementations.

FIG. 9B is a block diagram illustrating a representative camera 118 in accordance with some implementations. In some implementations, the camera 118 includes one or more processing units or controllers (e.g., CPUs, ASICs, FPGAs, microprocessors, and the like) 942, one or more communication interfaces 944, memory 946, one or more communication buses 948 for interconnecting these components (sometimes called a chipset), a lens assembly 9620, an IR filter 9622, an image sensor array 9624, and IR illuminators 9626 (e.g., IR LEDs). In some implementations, the lens system 9620 focuses incident light on the image sensor array 9624, which captures respective color components (e.g., R, G and B components) of the incident light focused on respective sensor array locations. When the camera is in Day mode, the IR filter 9622 is enabled/interposed between the lens system 9620 and the sensor array 9624 to block IR components of the incident light. When the camera is in Night mode, the IR filter 9622 is disabled so the image sensor array 9624 can receive incident IR light from a scene illuminated by the camera's onboard IR illuminators 9626 or external IR illuminators. In some implementations, the camera 118 includes one or more input devices 950 such as one or more buttons for receiving input and one or more microphones. In some implementations, the camera 118 includes one or more output devices 952 such as one or more indicator lights, a sound card, a speaker, a small display for displaying textual information and error codes, playing audio, etc. In some implementations, the camera 118 optionally includes a location detection device 954, such as a GPS (global positioning satellite) or other geo-location receiver, for determining the location of the camera 118.

Communication interfaces 944 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Figure 9C:
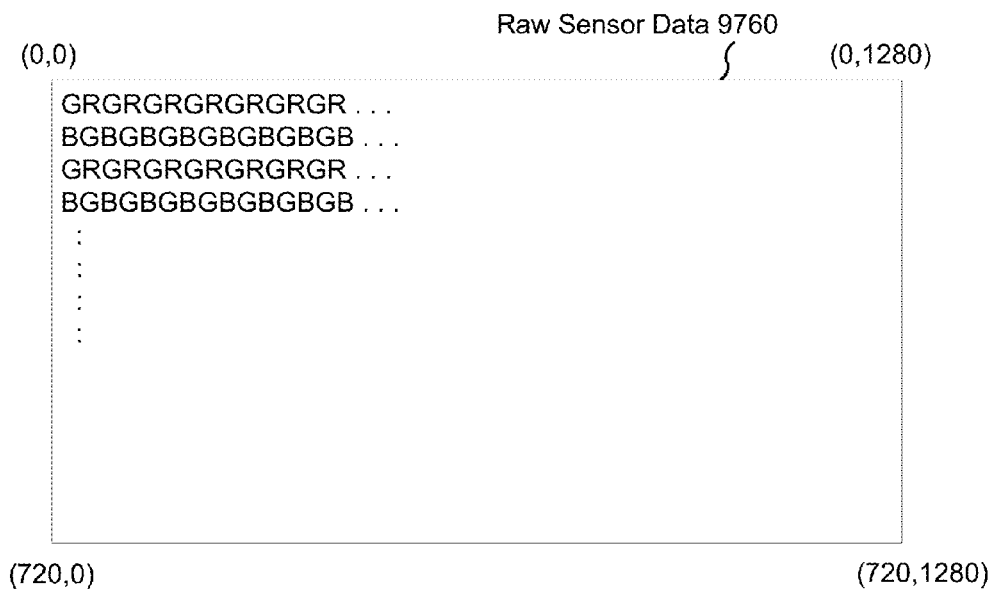
FIG. 9C is a block diagram illustrating a data structure used to store raw pixel data for a camera, in accordance with some implementations.
Figure 9D:
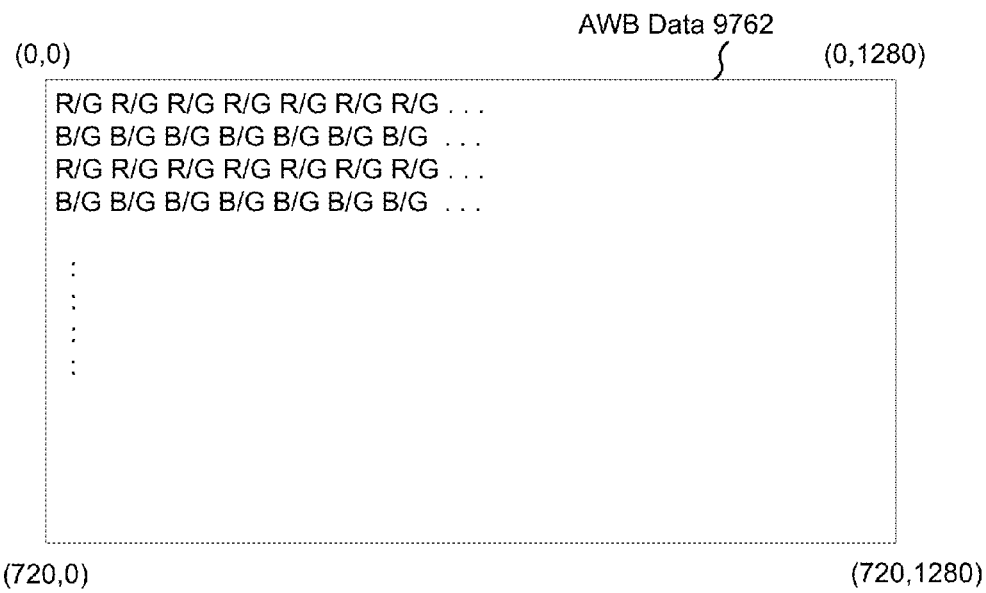
FIG. 9D is a block diagram illustrating a data structure used to store auto white balance (AWB) data for a camera, in accordance with some implementations.

Memory 946 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 946, or alternatively the non-volatile memory within memory 946, includes a non-transitory computer readable storage medium. In some implementations, memory 946, or the non-transitory computer readable storage medium of memory 946, stores the following programs, modules, and data structures, or a subset or superset thereof:

Operating system 956 including procedures for handling various basic system services and for performing hardware dependent tasks;

Network communication module 958 for connecting the camera 118 to other computing devices (e.g., hub device server system 508, video server system 552, the client device 504, network routing devices, one or more controller devices, and networked storage devices) connected to the one or more networks 162 via the one or more communication interfaces 944 (wired or wireless);

Video control module 960 for modifying the operation mode (e.g., zoom level, resolution, frame rate, recording and playback volume, lighting adjustment (e.g., performed by auto white balance (AWB) program module 960a), AE and IR modes, etc.) of the camera 118, enabling/disabling the audio and/or video recording functions of the camera 118, changing the pan and tilt angles of the camera 118, resetting the camera 118, enabling/disabling the IR filter 9622, and/or the like; The video control module 960 also includes a mode control program module 960b that determines when to switch from Night mode to Day mode and vice-versa in accordance with some implementions;

Video capturing module 964 for capturing and generating a video stream and sending the video stream to the hub device server system 508 or video server system 552 as a continuous feed or in short bursts, and optionally generating a rescaled version of the video stream and sending the video stream at the original captured resolution and the rescaled resolution;

Video caching module 966 for storing some or all captured video data locally at one or more local storage devices (e.g., memory, flash drives, internal hard disks, portable disks, etc.);

Local video processing module 968 for performing preliminary processing of the captured video data locally at the camera 118, including for example, compressing and encrypting the captured video data for network transmission, preliminary motion event detection, preliminary false positive suppression for motion event detection, preliminary motion vector generation, etc.; and Camera data 970 storing data, including but not limited to:
  Camera settings 972, including network settings, camera operation settings (such as frame rate 972a, analog sensor gain 972b, and Day/Night mode setting 972c), camera storage settings, etc.; and
  Video data 974, including video segments and motion vectors for detected motion event candidates to be sent to the hub device server system 508 or video server system 552.
  Raw sensor data 9760 (e.g., R, G and B components) captured from sensor pixel locations in the sensor array 9624 and saved as a raw image frame; in some implementations, the sensor is a "Bayer" sensor, where R, G and B pixels are captured from alternate sensor pixel locations in such a way that two times more G component values are captured than R or B component values; other implementations employ different types of sensors to provide the Raw sensor data 9760, including sensors with other arrangements of R, G and B color filters (e.g., a sensor producing an equal number of R, G and B components), and sensors that employ different color filters (e.g., a sensor with cyan (C), yellow (Y) and magenta (M) color filters, which produces C, Y and M components). An example view of the R, G and B values from a Bayer sensor is shown in FIG. 9C. Implementations described herein may employ data (e.g., color component values or ratios thereof) from all or a portion of the sensor array 9624; accordingly, a reference herein to a "sensor array" or a "color sensor array" may refer to all or a portion of the sensor array 9624. In some implementations, a group of sensor arrays, including a sensor array subdivided into tiles, may be referred to as a "sensor array system" or a "color sensor array system."
  Auto white balance (AWB) data 9762, including data derived from the raw sensor data 9760 used to identify and compensate for the color temperature of the ambient light condition (e.g., sunlight vs. incandescent light vs. fluorescent light, etc.); in some implementations, the AWB data 9762 includes R/G and B/G ratios for respective pixel locations derived from the corresponding raw Bayer sensor data 9760; in some implementations, these ratios are used directly to determine whether to switch from Night mode to Day mode. An example view of the R/G and B/G values from a the AWB data 9762 is shown in FIG. 9D.
  All_lights lookup table (LUT) 9764, a table used in the Night mode to Day mode switching method of the present application to identify based on pairs of R/G and B/G ratios from the AWB table 9762 whether the associated ambient light is due to other than an IR illuminant; as shown in FIG. 9E, described below, the majority of the table is filled with 1s (meaning the light is due to other than an IR-only illuminant), except for a small region around R/G=1, B/G=1 associated with 0 lux (IR only) light sources. The all_lights lookup table is described further in reference to FIGS. 13A-C.
  Sunlight lookup table (LUT) 9766, a table used in the Night mode to Day mode switching method of the present application to identify based on pairs of R/G and B/G ratios from the AWB table 9762 whether the associated ambient light is due to sunlight, incandescent or similar light sources that are comparatively heavy emitters of IR light as compared to visible light; as shown in FIGS. 9E and 9F, this table corresponds to a small region of the All_lights table—and is filled with 1s to represent where the corresponding R/G and B/G values are associated with sunlight and incandescent light. The sunlight lookup table is described further in reference to FIGS. 13A-C.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 946, optionally, stores a subset of the modules and data structures identified above. Furthermore, memory 946, optionally, stores additional modules and data structures not described above. Additionally, camera 118, being an example of a smart device 204, optionally includes components and modules included in smart device 204 as shown in FIG. 9A that are not shown in FIG. 9B.

In some implementations, the camera 118 captures surveillance video using a digital imaging system. Digital images (frames) are captured as a sequence at a particular frame rate 972a, compressed, and then sent to the "cloud"

(e.g., the hub device server system 508 or the video server system 552) for storage and retrieval. In some implementations, each frame (e.g., the raw sensor data 9760) is composed of 1280 by 720 pixels (1280×720) and each pixel location has 3 color components, red, green and blue. The camera 118 operates in one of two modes (e.g., indicated by the Day/Night mode value 972c) depending on the ambient lighting conditions. Day mode is used when there is sufficient ambient light to adequately illuminate the scene. Night mode is used when there is not enough light to adequately illuminate the scene.

In some implementations, when operating in Day mode, the camera 118 uses the ambient lighting sources to illuminate the scene and capture surveillance video. In some implementations, the minimum lux level at which the camera captures 118 video in Day mode is between 0.1 to 1 lux depending on the color temperature of the dominant illuminant. Once the minimum lux level is reached, the camera automatically switches to Night mode. Switching to Night mode includes mechanically disabling/removing the IR filter 9622 and enabling a set of IR LEDs 9626 to provide illumination for the scene. Nightmode is maintained until the camera 118 detects an external illuminant.

In an implementation of a prior mode switching technique (described further with reference to FIG. 12A), the camera 118 does detects an external illuminant by comparing the average maximum R, G, or B pixels to the minimum average R, G, or B pixels. The averages are calculated over a majority of the image. By comparing max to min values to a threshold it can be determined whether or not an external illuminant is present at a minimal lux level. Unfortunately, the lux level at which switching occurs varies with the color temperature of the illuminant, thus with this prior mode switching method there are scenes in which switching occurs too early, negating any hysteresis available, and resulting in oscillations between Day mode and Night mode. Additionally, some illuminants are not detected at all, resulting in the camera never switching from Night mode to Day mode.

Figure 10:
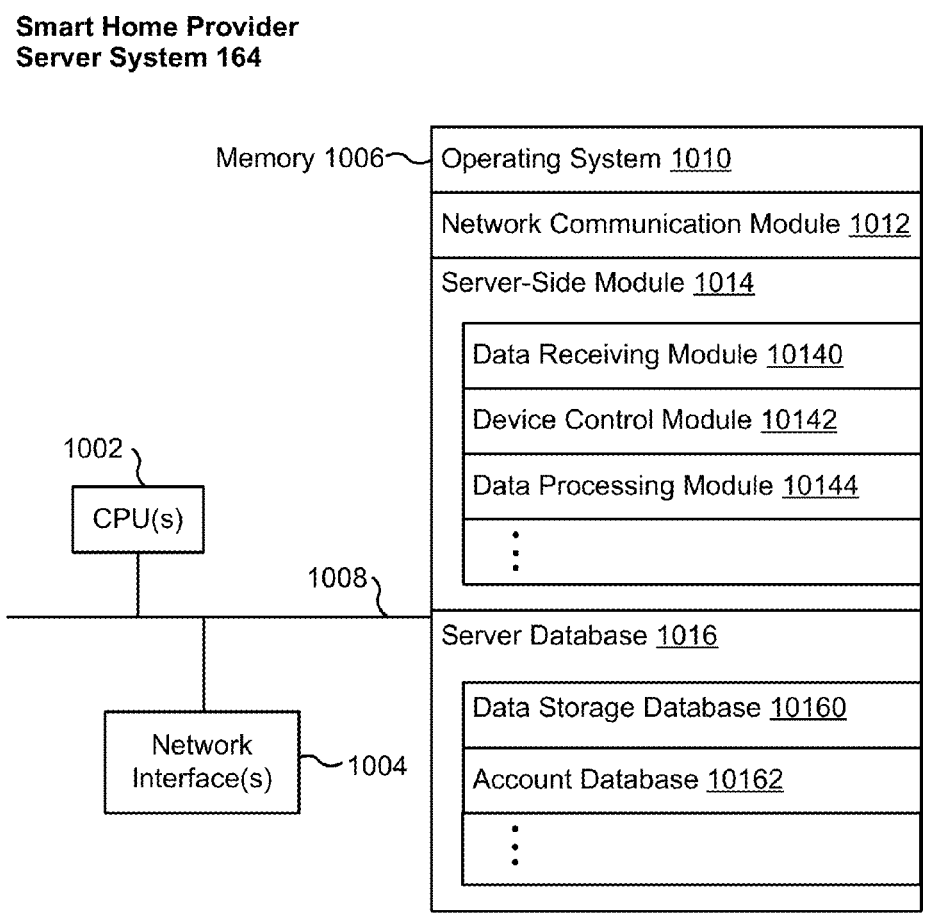
FIG. 10 is a block diagram illustrating a representative smart home provider server system, in accordance with some implementations.

FIG. 10 is a block diagram illustrating the smart home provider server system 164 in accordance with some implementations. The smart home provider server system 164, typically, includes one or more processing units (CPUs) 1002, one or more network interfaces 1004 (e.g., including an I/O interface to one or more client devices and an I/O interface to one or more electronic devices), memory 1006, and one or more communication buses 1008 for interconnecting these components (sometimes called a chipset). Memory 1006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

Operating system 1010 including procedures for handling various basic system services and for performing hardware dependent tasks;

Network communication module 1012 for connecting the smart home provider server system 164 to other systems and devices (e.g., client devices, electronic devices, hub device server system 508, video server system 552, and systems connected to one or more networks 162, FIGS. 1-5B) via one or more network interfaces 1004 (wired or wireless);

Server-side module 1014, which provides server-side functionalities for device control, data processing and data review, including but not limited to:

Data receiving module 10140 for receiving data from electronic devices (e.g., video data from a camera 118, FIG. 1), and preparing the received data for further processing and storage in the data storage database 10160;

Device control module 10142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 10144 for processing the data provided by the electronic devices, and/or preparing and sending processed data to a device for review (e.g., client devices 504 for review by a user); and Server database 1016, including but not limited to:

Data storage database 10160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the electronic devices are stored securely; and Account database 10162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

Furthermore, in some implementations, the functions of any of the devices and systems described herein (e.g., hub device 180, hub device server system 508, video server system 552, client device 504, smart device 204, camera 118, smart home provider server system 164) are interchangeable with one another and may be performed by any other devices or systems, where the corresponding submodules of these functions may additionally and/or alternatively be located within and executed by any of the devices and systems. As one example, generating of user interfaces may be performed by the user interface module 74610 (which may be located at the client interface server 556 or at the video server 554) or by the user interface module 826, depending on whether the user is accessing the video feeds and corresponding histories through a web browser 823 or an application 824 (e.g., a dedicated smart home management application) at the client device 504. The devices and systems shown in and described with respect to FIGS. 6-10 are merely illustrative, and different configurations of the modules for implementing the functions described herein are possible in various implementations.

Switching from Night Mode to Day Mode

Illuminant Detection

As mentioned above, in some implementations, a camera 118 utilizes a combination of illuminant detection, lux level detection, and tiling to determine when to switch from Night mode to Day mode. In some implementations, one or more of these evaluations/operations are performed by the mode control program module 960b (FIG. 9B), which subsequent to the determination initiates a switch from Night mode to Day mode if justified by the evaluations/operations.

Illuminant detection involves determining the type of primary light source that is illuminating a scene or a portion of a scene captured by the camera 118. During development of the systems and method described herein, experiments were performed to measure in Night mode specific combinations of red (R), green (G), and blue (B) color components and lux associated with different light source types/lighting conditions at different distances from the camera 118. All measurements were normalized to IR only against a flat white reflective service and R/G and B/G plotted for the different light source types.

Figure 11A:
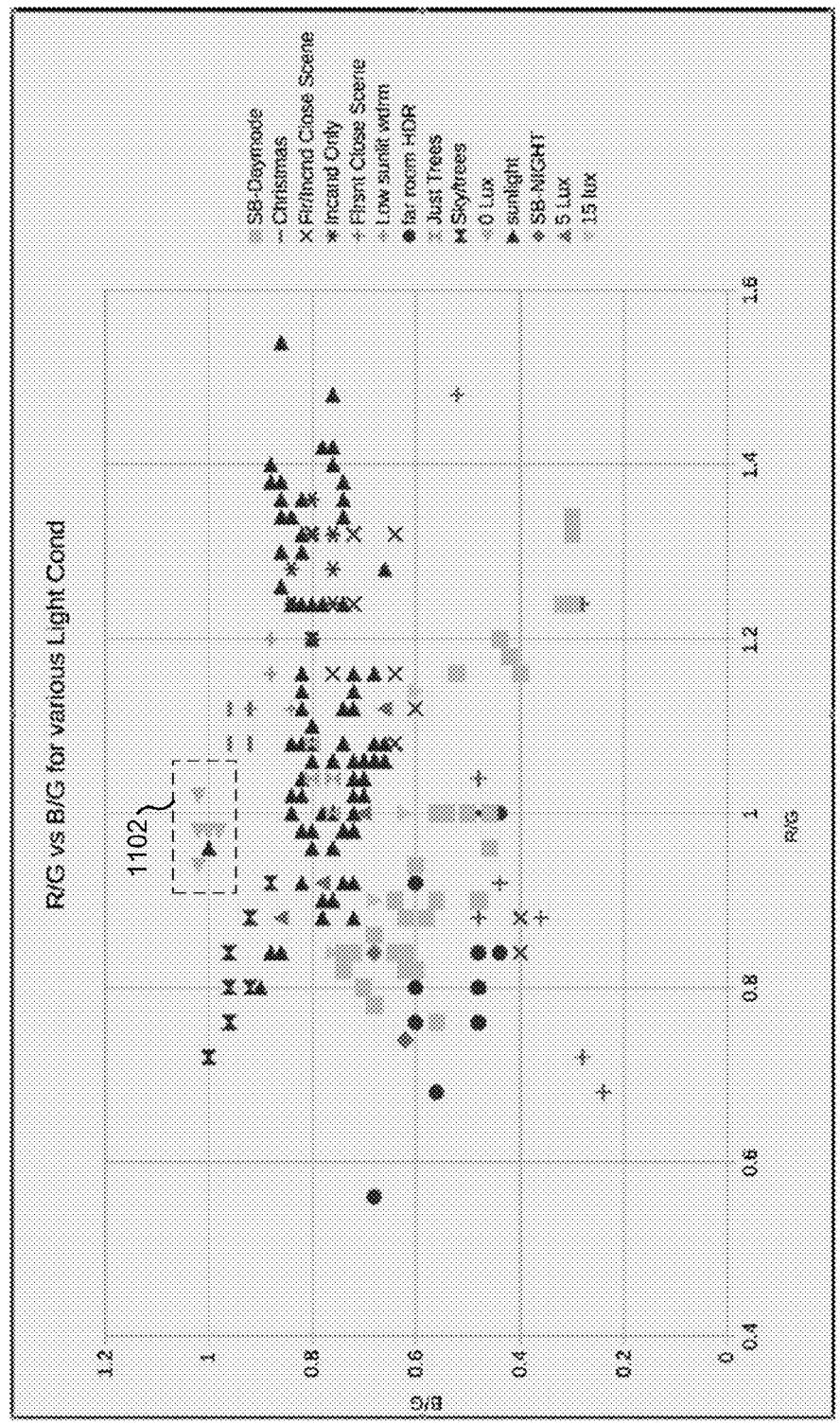
FIG. 11A is a graph of R/G vs. B/G (where R, G, and B represent red, green and blue illuminant components) for different lighting conditions.

The light source types/lighting conditions that were evaluated represent the wide range of light source types that might be found in environments (e.g., home, office, retail business) where security cameras 118 are installed, including:

Special Blue (SB) filling the camera field of view measured in Day mode (this is a particular blue that when illuminated by shad sunlight looks like pure IR illumination);
Christmas lights;
Combination of fluorescent and incandescent lights illuminating a scene at close range;
Incandescent lights illuminating a scene;
Fluorescent lights illuminating a scene at close range;
Low sunlight;
Far room HDR (situation where a camera is looking into a long room (e.g., 20 meters deep) where the scene has very high dynamic range (e.g., very dark and very light regions);
Light from just trees outside a window;
Light from a combination of sky and trees outside a window;
Purely IR light (0 lux measured in Night mode);
Sunlight;
Special Blue 9SB) filling the camera field of view in Night mode;
Overall ambient illumination at 5 lux (measured in Night mode);
Overall ambient illumination at 15 lux (measured in Night mode);

The resulting measurements are shown in FIG. 11A, which is a graph of RIG vs. B/G ratios for the different lighting conditions identified above. The graph legend identifies the marks used to indicate the type of light source/lighting condition associated with the different measurements. The graph in FIG. 11A shows that it is possible to identify when a scene is being illuminated solely by IR light (e.g., see the boxed-in cluster 1002 of marks associated with 0 lux measurements, which are located near the intersection of R/G=1 and B/G=1). In some implementations, different light source types/lighting conditions can be evaluated in a similar manner to identify color temperature characteristics associated with different relevant light source types for different environments. Similarly, in some implementations, different functions of color components (e.g., not just R/G and B/G ratios) can be used to evaluate color temperature characteristics of different light source types. That said, it is particularly effective to use R/G and B/G ratios since those values are provided automatically by the AWB processing module 960a as part of auto white balance (AWB) processing performed in most digital cameras.

Lux Level Detection

In some implementations, identifying the color temperature of the light source (illuminant detection, described above) that is dominating the scene is only one part of determining whether or not to switch to Day mode. Some implementations also determine how much ambient light is available, i.e. what is the lux level of the ambient light. In some implementations, this is done by detecting the analog gain being applied to the image. (e.g., the gain applied to image sensor measurements). In some implementations, analog gain has a range of 0 db to 36 db. In some implementations, in Night mode, the frame rate can be 7.5, 15, or 30 frames per second (fps). Going from 30 fps to 15 fps is equivalent to a 6 db increase in analog gain; similarly going from 15 fps to 7.5 fps corresponds to another 6 db increase in analog gain. (This is similar to the direct relationship between the sensitivity of an image sensor and slower shutter speeds). Therefore, some implementations normalize analog gain to 30 fps then compare the current analog gain to a threshold in order to determine if there is sufficient light to afford enough hysteresis to switch from Night mode to Day mode. For example, some implementations switch from Night mode to Day mode at a higher lux level than from Day mode to Night mode; this is to prevent the camera 118 from switching back to the prior mode—e.g., switching back to Night mode immediately following a mode switch to Day mode). During experimental testing described above with respect to FIG. 11A, it was found that certain light sources (e.g., Christmas lights, incandescent lights and shady sunlight) have very high IR components, and since these measurements are being made in "Nightmode", i.e., when there is no IR filter, those IR components cause the apparent lux level to appear to be very high, even though the visible light was quite low. In order to address this issue, some implementations turn once again to illuminant detection to help determine the analog gain threshold at which we will switch from Night mode to Daymode.

Figure 11B:
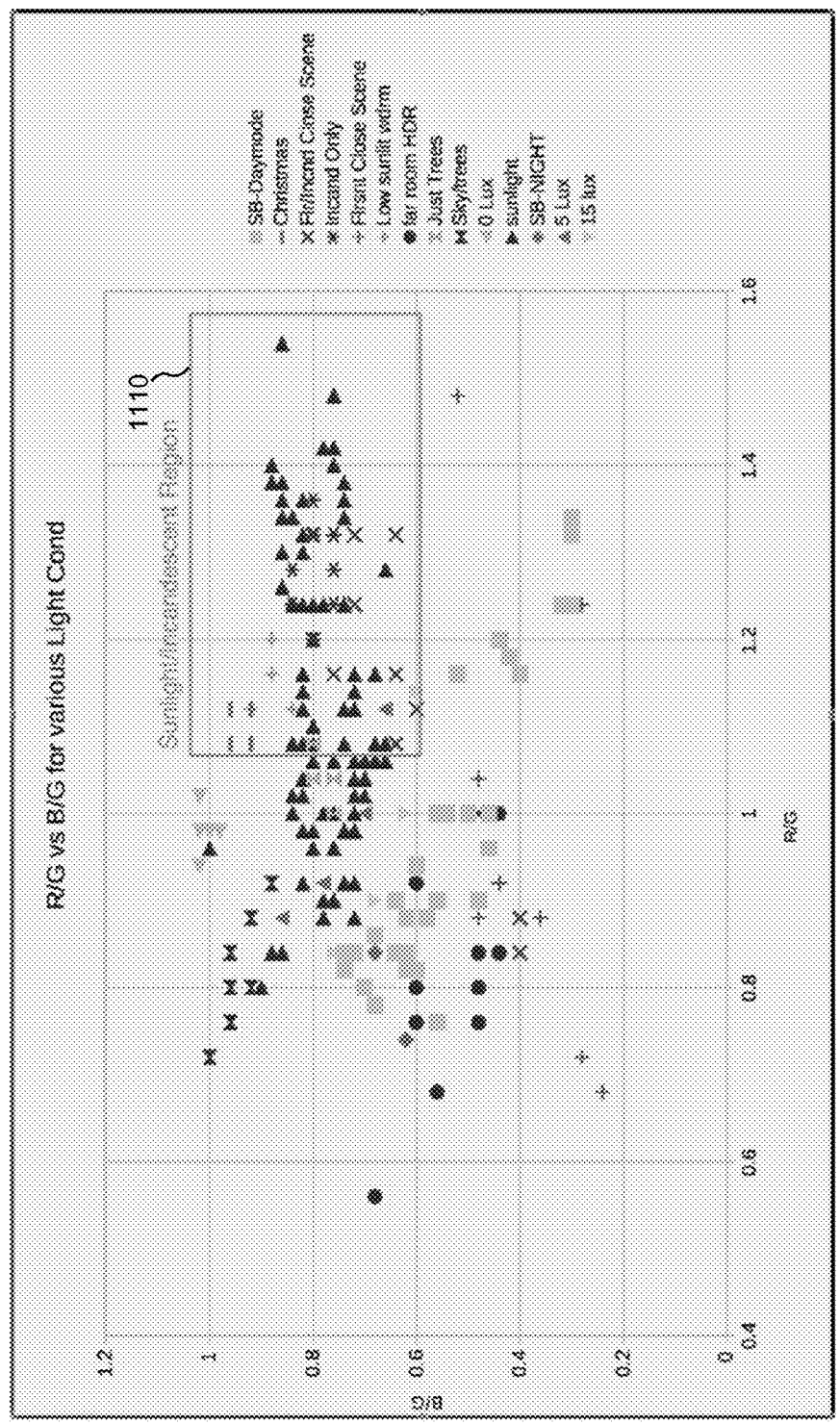
FIG. 11B is a graph of R/G vs. B/G (where R, G, and B represent red, green and blue illuminant components) for different lighting conditions, highlighting a sub-region associated with sunlight and incandescent lights.

FIG. 11B is a graph of R/G vs. B/G (where R, G, and B represent red, green and blue illuminant components) for different lighting conditions, outlining a region 1110 associated with sunlight and incandescent lights. In some implementations, the outlined region has a different analog gain threshold than all other illuminants, meaning that, due to presence of high amounts of IR in sunlight and incandescent lights, in some implementations, the measured lux in Night mode associated with such light sources needs to be higher for a switch to occur to Day mode than for other non-IR light sources (e.g., the non-IR light sources whose associated R/G and B/G ratios fall outside the sunlight/incandescent region 1110.

In some implementations of Night mode to Day mode switching methods, one or more lookup tables (e.g., the lookup tables 9764, 9766) are used to represent the graphs of FIGS. 11A and 11B so as to enable the camera 118 to efficiently identify lighting conditions for light received at all or a portion of the image sensor array 9624 based on R/G and B/G ratios (i.e., the indices into the one or more lookup tables) of the received light. In some implementations, other methods can also be used to represent the graphs of FIGS. 11A and 11B.

Tiling

Illuminant detection can be applied to an entire image or to any portion of an image. By breaking up an image into tiles it is possible to determine if a particular illuminant is predominantly occurring in only a small portion of the image and therefore does not warrant a Nigh mode to Day mode switch. This is especially useful in detecting point sources of light (e.g., flashlights). Advantages of a tiling approach as compared to a non-tiling approach are illustrated in FIGS. 12A and 12B, which show the very different video images produced by two identical cameras 118 using different methods to decide when to switch from Night mode to Day mode.

Figure 12A:
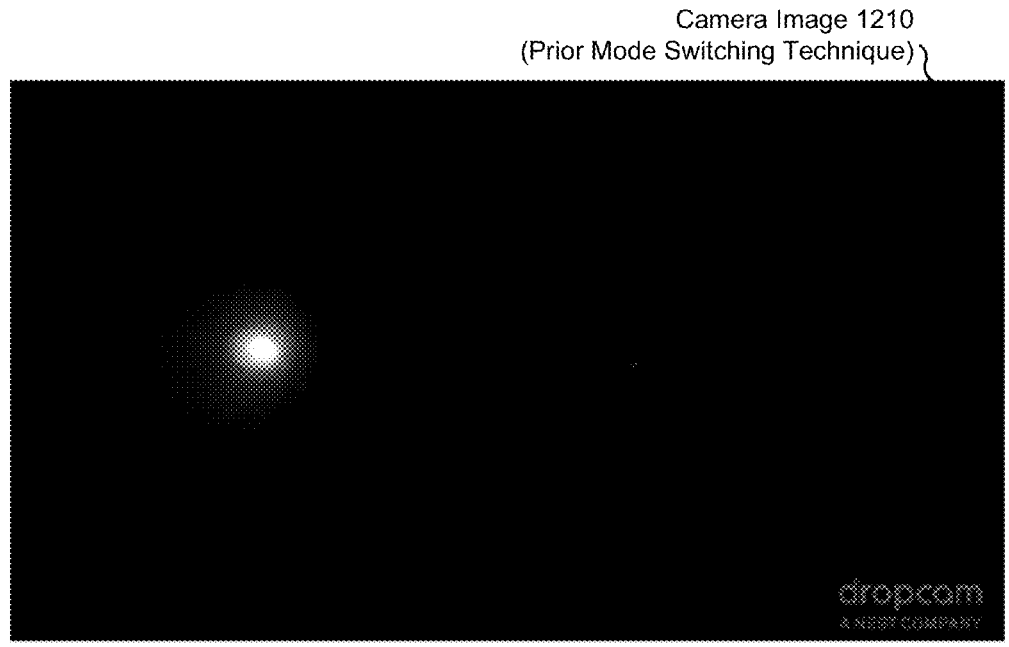
FIG. 12A is an image from a camera showing a result of transitioning from Night mode to Day mode when there is not enough visible light in the scene.

FIG. 12A is an image from a camera implementing a prior mode technique showing a result of incorrectly transitioning from Night mode to Day mode due to light from a flashlight fooling the camera into thinking that there is enough visible light in the scene. Note in FIG. 12A that the scene is entirely dark except for the flashlight, indicating that the scene is not adequately illuminated for Day mode operations. In contrast, FIG. 12B is an image from a camera showing a result of deciding based on a tiling approach not to transition from Night mode to Day mode in the lighting conditions of FIG. 12A, in accordance with some implementations. By applying a tiling approach, the effect of the flashlight is restricted to tiles of the image sensor corresponding to the position in the image of the flashlight. As a result, the Night mode to Day mode switching does not occur due to limited impact of the flashlight on the lux level detected for other tiles of the image sensor.

Figure 12B:
FIG. 12B is an image from a camera showing a result of deciding not to transition from Night mode to Day mode in the lighting conditions of FIG. 12A, in accordance with some implementations.
Figure 12C:
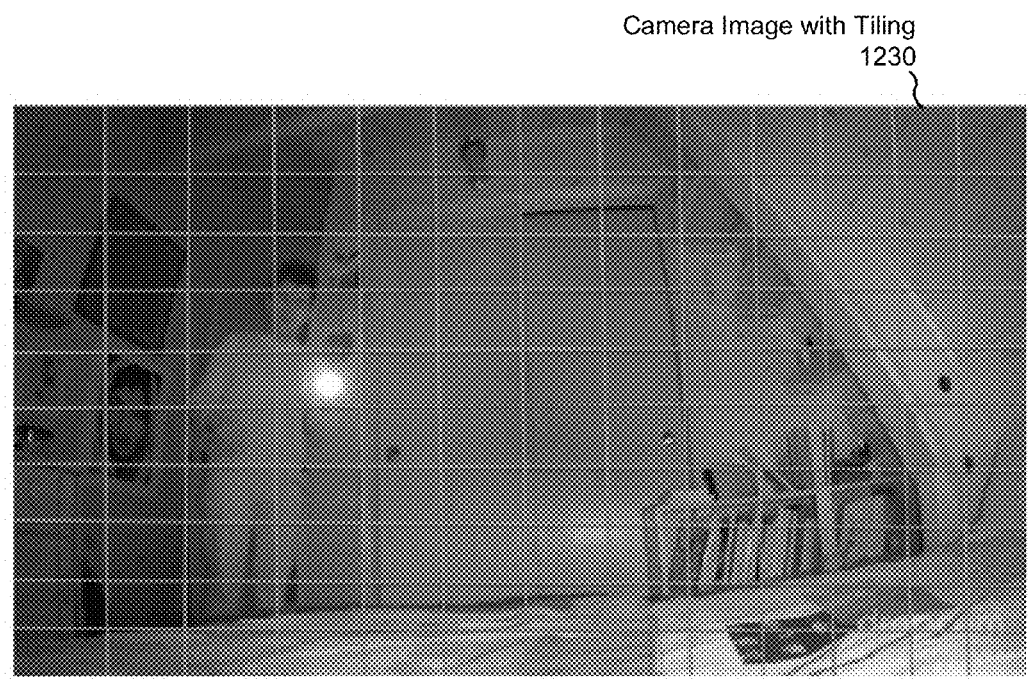
FIG. 12C is an illustration of a tiled arrangement used for processing ambient light in Night mode in accordance with some implementations overlaid on the image of FIG. 12B.

FIG. 12C is an illustration of a tiled arrangement used for processing ambient light in Night mode in accordance with some implementations overlaid on the image of FIG. 12B. This tiling, which is illustrative, shows how the flashlight is contained in one tile, which in accordance with some implementations prevents the camera from switching to Day mode prematurely.

Figure 13A:
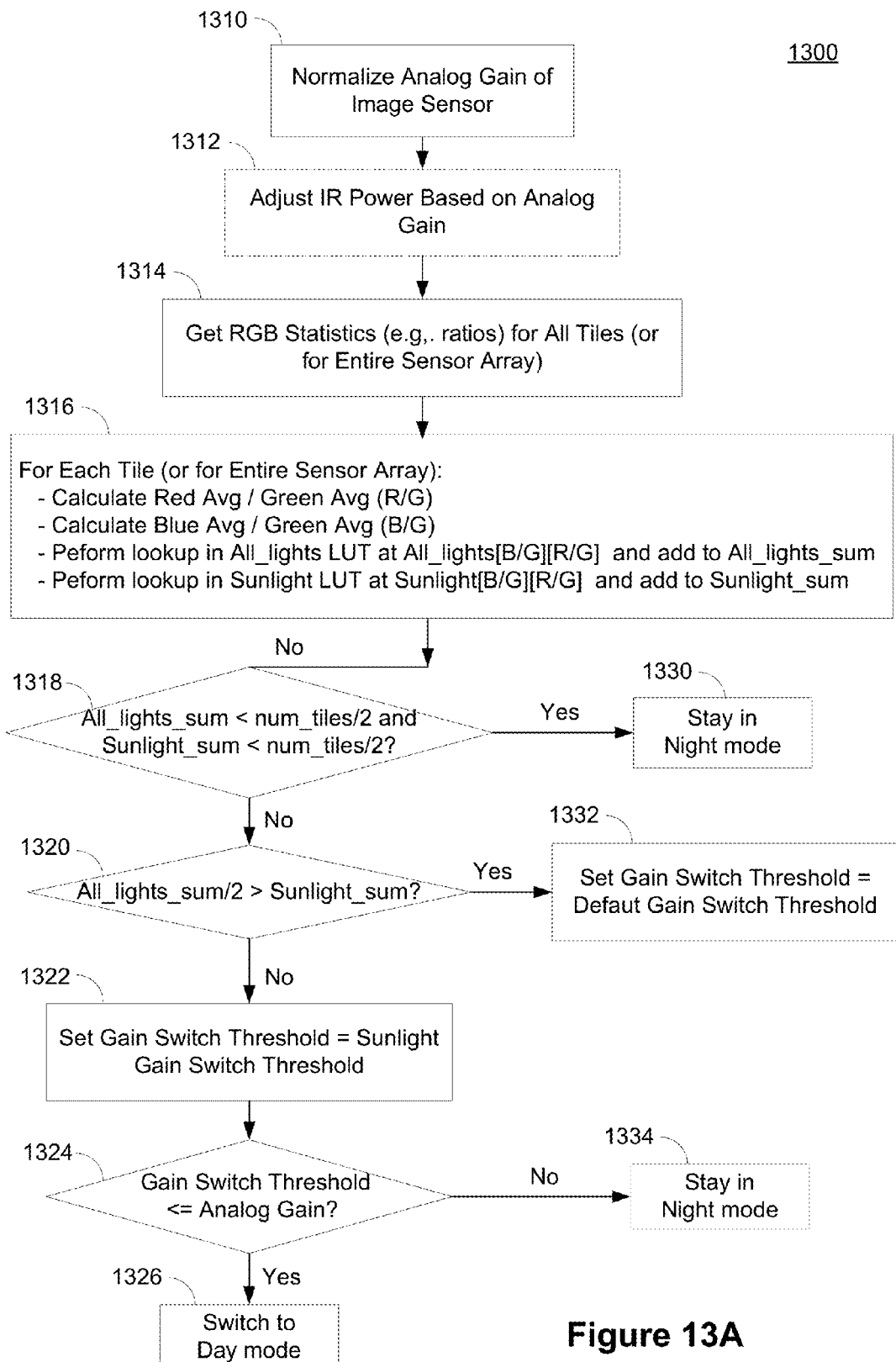
FIG. 13A is a flowchart of a program for deciding when to switch from Night mode to Day mode, in accordance with some implementations.

FIG. 13A is a flowchart of a method 1300 implemented in a camera 118 (FIG. 9B) for deciding when to switch from Night mode to Day mode, in accordance with some implementations. In some implementations, the method 1300 is performed by a camera with one or more processors, memory, a lens assembly, and IR filter assembly, and an image sensor. For example, in some implementations, the method 1300 is performed by a camera 118 (FIG. 9B-9D), or one or more components thereof (e.g., operating logic 956, video control module 960 (including auto white balance module 960*a*, mode control module 960*b*), video capturing module 964, video caching module 966 and local video processing module 968). In some implementations, the method 1400 is governed by instructions that are stored in a non-transitory computer readable storage medium (e.g., the memory 946) and the instructions are executed by one or more processors of the electronic device (e.g., the CPUs 942). Optional operations are indicated by dashed lines (e.g., boxes with dashed-line borders). In some implementations, the method 1300 uses data stored in the memory 946 of the camera 118, including frame rate 972*a*, analog sensor gain 972*b*, raw sensor data 9760, AWB data 9762, All_lights lookup table (LUT) 9764, and Sunlight/incandescent lookup table (LUT) 9766.

Figure 13B:
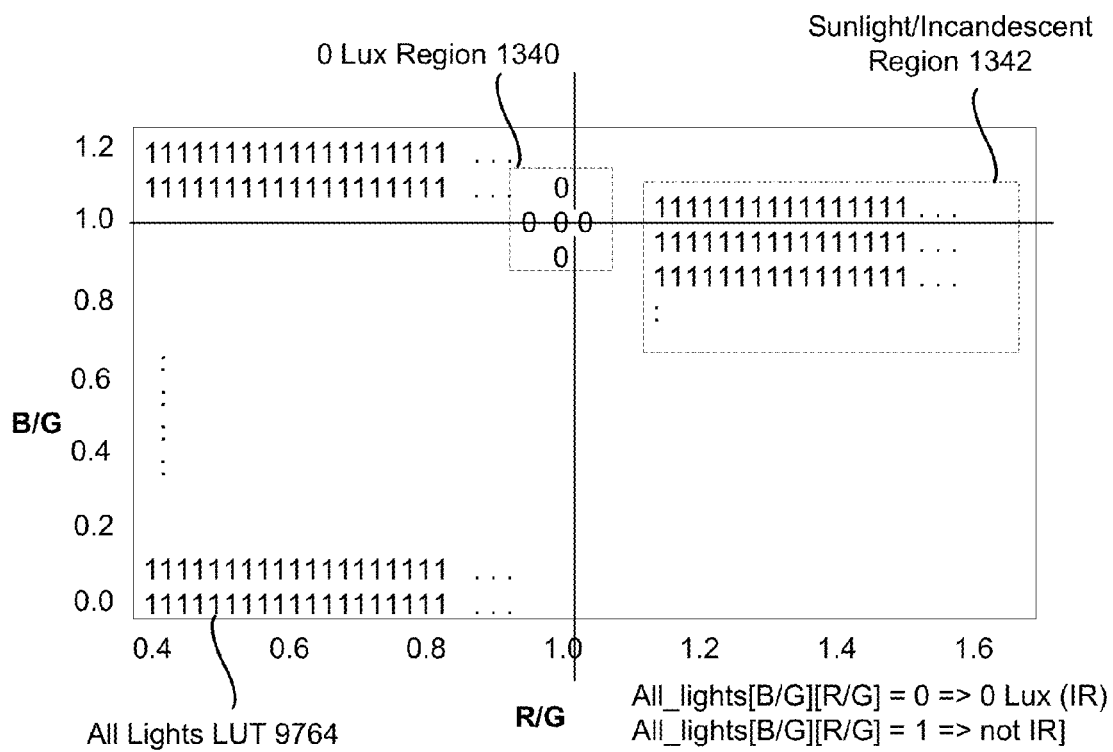
FIG. 13B is a block diagram illustrating an all lights lookup table (LUT) stored in a camera, in accordance with some implementations.
Figure 13C:
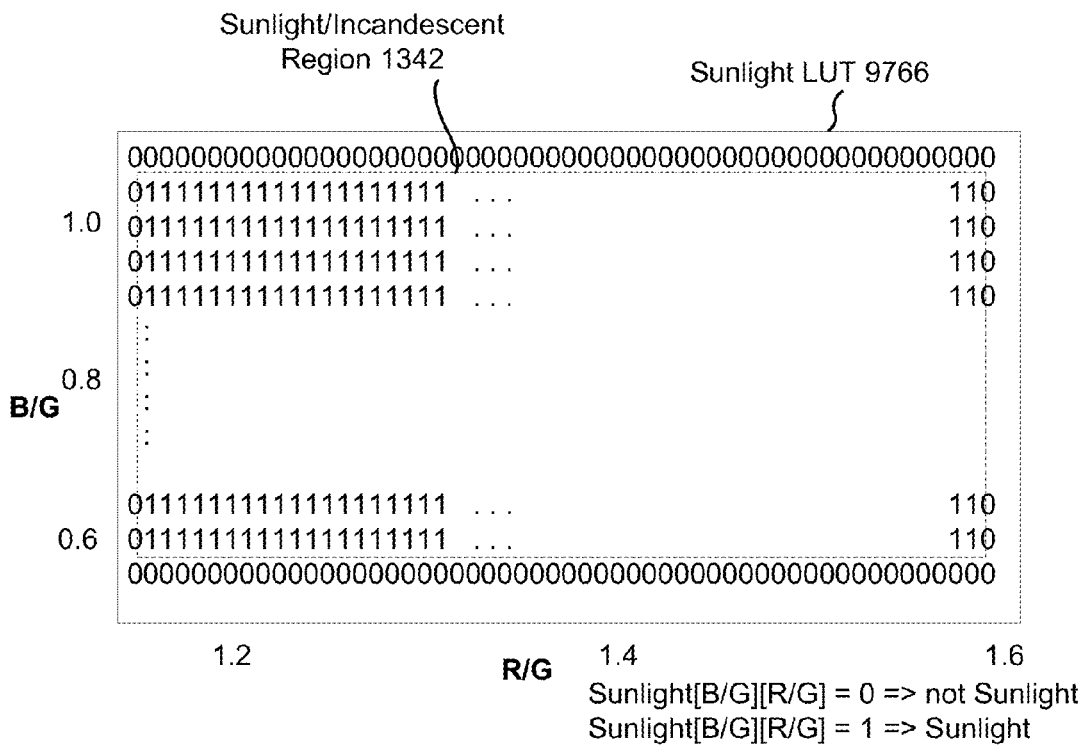
FIG. 13C is a block diagram illustrating a sunlight lookup table (LUT) stored in a camera, in accordance with some implementations.

Examples of the All_lights lookup table (LUT) 9764, and the Sunlight/incandescent lookup table (LUT) 9766 are shown in FIGS. 13B and 13C, in accordance with some implementations. These tables correspond to the graphs shown in FIGS. 11A and 11B but are structured as lookup tables to permit efficient implementation of illuminant detection as part of the described methods. Referring to FIG. 13B, in some implementations, the All_lights lookup table 9764 is populated with 1's except for a small region 1340 populated with 0's located near the intersection of B/G=1 and R/G=1, which is associated with 0 lux (or pure IR) illuminants. The region 1342 of this table indicates ranges of B/G and R/G ratios associated with illuminants that are sunlight or incandescent light. Performing a lookup into the All_lights lookup table 9764 using a pair of B/G and R/G ratios for an associated sensor region (converted to appropriately scaled integers) as indices into the table will return "0" for 0 lux illuminants and "1" for other than pure IR illuminants—to indicate the predominant illuminant type for that sensor region. Referring to FIG. 13C, in some implementations, the Sunlight lookup table 9766 is a higher resolution representation of the sunlight incandescent region 1342 of FIG. 13B. The Sunlight lookup table 9766 is populated with 1's for ranges of B/G and R/G associated with sunlight and incandescent illuminants and 0's elsewhere (e.g., for all other illuminant types). The higher resolution representation of the sunlight/incandescent region 1342 enables fine distinctions to be made between the color profiles (e.g., color component ratios) of sunlight/incandescent illuminants, which require higher lux levels for switching to Day mode, and other illuminants with similar color profiles, which require default (lower) lux levels for switching to Day mode. Performing a lookup into this table using a pair of B/G and R/G ratios for an associated sensor region (converted to appropriately scaled integers) as indices into the table will return "0" for sunlight and incandescent illuminants and "1" for other types of illuminants—to indicate the predominant illuminant type for that sensor region. As noted above, the lookup tables illustrated in FIGS. 13B and 13C are examples used in some implementations. Other implementations can employ one or more lookup tables for the same purpose (e.g., a single lookup table with enough resolution to accurately identify illuminants that have color characteristics of sunlight or incandescent lights), can use values other than "0" and "1" to represent regions of interest (e.g., sunlight and 0 lux regions), can be structured differently (e.g., as other than 2-dimensional tables), and can be accessed using different indices (e.g., raw R, G and B components instead of color component ratios).

The method 1300 presumes a tiling approach in which illuminant and lux detection operations are performed for each of plurality of tiles that collectively compose the sensor (FIG. 12C). The method can also be applied to implementations where the sensor is not tiled (in which case the number of tiles, "num_tiles," referred to in the method 1300 equals 1).

As described above, in some implementations sensor gain is normalized (1310) so measured analog sensor gain can be compared to predefined switching thresholds. E.g., in some implementations, sensor gain is normalized to a particular frame rate (e.g., 30 fps).

In some implementations, the method 1300 optionally adjusts power of the onboard IR LEDs 9626 as function of normalized analog gain (i.e. lux level) (1312). In particular, if the measured lux level is low, IR LED Power is increased; if the measured lux level is high, then IR LED power is decreased. In some implementations, illuminant detection is not performed until the IR LED power is 1/100th of the max IR LED power (indicating that there is very little need for on-board illumination of the scene).

As in initial step in illuminant detection, RGB statistics (e.g., ratios or raw component values) are obtained for each tile (or for the entire sensor array) (1314). In some implementations, the RGB statistics are derived from the raw sensor data 9760 or the AWB data 9762 (FIG. 9B). The following operations are then performed for each tile as part of illuminant detection (1316):

Calculate the ratio of average R component values to average G component values (the result is the average ratio R/G for the tile);

Calculate the ratio of average B component values to average G component values (the result is the average ratio B/G for the tile);

Using the calculated B/G and R/G values for the tile, perform a lookup operation in the All_lights LUT using the pair of ratios (converted to appropriately scaled integers) as indices into the table, and add the returned value ("0"=0 lux; "1"=other than IR) to a variable, "All_lights_sum," that keeps track of the number of tiles for which an illuminant other than a purely IR source is detected; thus, each individual "1" value returned from the All_lights table acts as a mode change signal that provides an individual vote for switching from Night mode to Day mode based on the characteristics of the predominant illuminant for that tile;

Using the calculated B/G and R/G values for the tile, perform a lookup operation in the Sunlight LUT using the pair of ratios (converted to appropriately scaled integers) as indices into the table, and add the returned value (0=not sunlight.incandescent; 1=sunlight/incandescent) to a variable, "Sunlight_sum," that keeps track of the number of tiles for which an illuminant that is sunlight or incandescent light is detected;

Having performed the above operations across all of the tiles (or the entire image sensor array), the total number of tiles illuminated by other than pure IR illuminants ("All_lights_sum") is compared to a threshold number of tiles*1318). In some implementations, the threshold number of tiles is the total number of sensor tiles divided by 2 ("num_tiles/2"). Other implementations can employ other thresholds. The total number of tiles illuminated by sunlight ("Sunlight_sum") is also compared to a threshold number of tiles (1318). In some implementations, the threshold number of tiles is the total number of tiles divided by 2 ("num_tiles/2"). Other implementations can employ other thresholds.

If the total number of tiles illuminated by other than pure IR illuminants ("All_lights_sum") and the total number of tiles illuminated by sunlight ("Sunlight_sum") are both less than the threshold (1318—Yes), the camera will stay in Night mode (1330). Otherwise, the weighted total number of tiles illuminated by other than pure IR illuminants ("All_lights_sum/2") is compared to the total number of tiles illuminated by sunlight and incandescent light sources ("Sunlight_sum") (1320). If the weighted total number of tiles illuminated by other than pure IR illuminants (All_lights sum/2) is greater than the total number of tiles illuminated by sunlight ("Sunlight_sum") (1320—Yes) (indicating that the predominant illuminant is not sunlight), the maximum analog "Gain Switch Threshold" for switching to Day mode is set at a predefined default gain switch threshold (1332). Otherwise (1320—No) (indicating that the predominant illuminant is sunlight), the maximum analog "Gain Switch Threshold" for switching to Day mode is set at a predefined sunlight gain threshold, which is lower than the default gain switch threshold (1322). In the preceding discussion, it is presumed that a higher analog sensor gain indicates a lower ambient light level (i.e. less lux). Thus, as described above, when the predominant light source is sunlight or incandescent light, more lux is required to enable switching to Day mode from Night mode.

The "Gain Switch Threshold" is then compared to the current analog sensor gain (1324). If the analog sensor gain is less than or equal to the "Gain Switch Threshold," (1324—Yes), the camera is switched to Day mode (1325). Otherwise (1324—No), the camera 118 will stay in Night mode (1334).

Figure 14B:
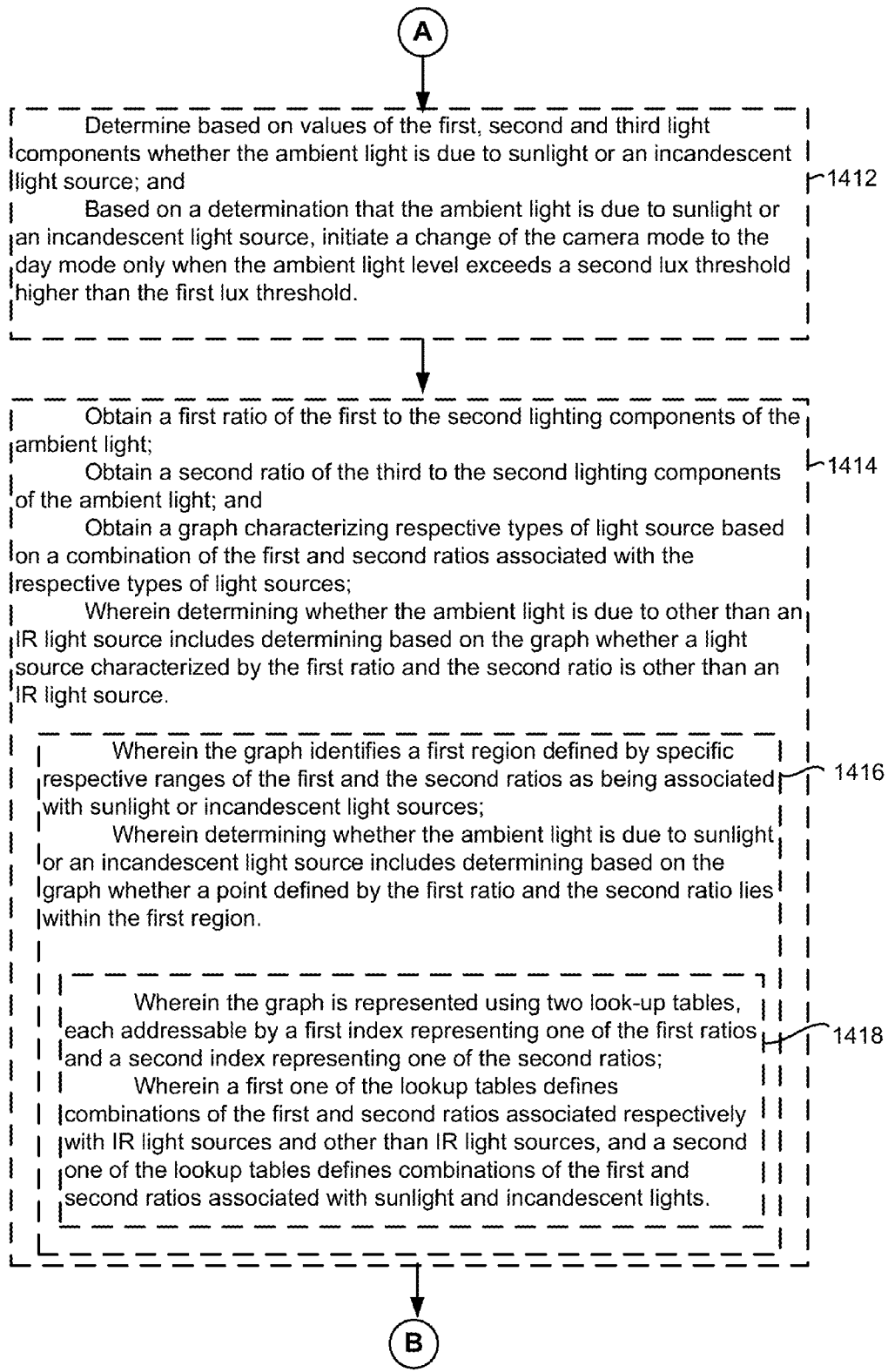
Figure 14C:
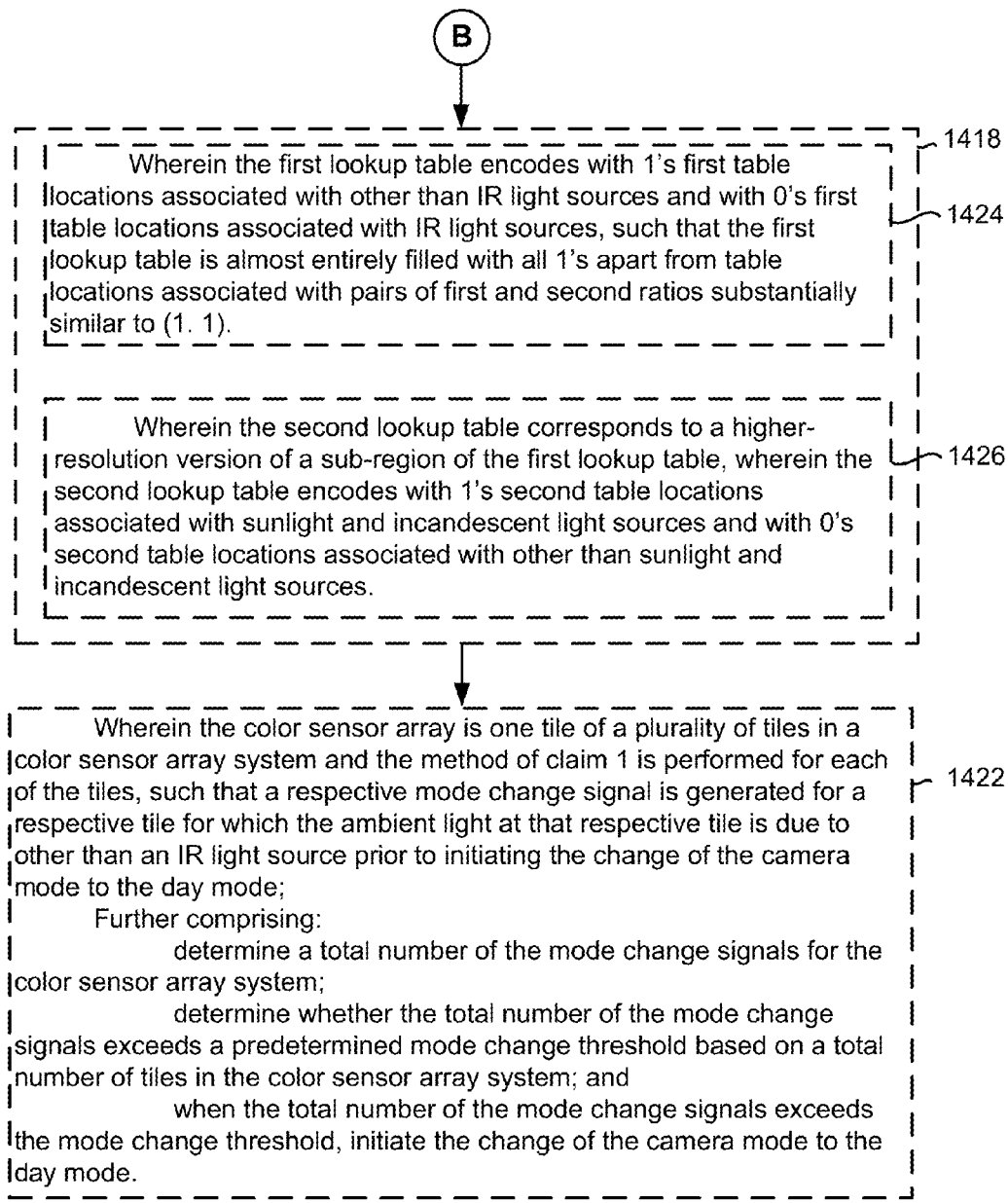

FIGS. 14A-14C illustrate a flowchart diagram of a method 1400 for determining when to switch a camera from Night mode to Day mode, in accordance with some embodiments. In some implementations, the method 1400 is performed by a camera with one or more processors, memory, a lens assembly and an image sensor (1402). For example, in some implementations, the method 1400 is performed by a camera 118 (FIG. 9B-9D), or one or more components thereof (e.g., operating logic 956, video control module 960 (including auto white balance module 960a, mode control module 960b), video capturing module 964, video caching module 966 and local video processing module 968). In some implementations, the method 1400 is governed by instructions that are stored in a non-transitory computer readable storage medium (e.g., the memory 946) and the instructions are executed by one or more processors of the electronic device (e.g., the CPUs 942). Optional operations are indicated by dashed lines (e.g., boxes with dashed-line borders).

Referring to FIG. 14A, in some implementations, the camera includes a controller, memory storing instructions for execution by the controller, a color sensor array comprising a plurality of sensor locations, the sensor locations including first, second and third pixels each having respective peak responses at different respective visible light frequencies, and a lens assembly that is configured to focus light on the sensor array (1402). When the camera mode is Night mode and the sensor is exposed to ambient light via the lens assembly: the camera detects a first light component of the ambient light by averaging output signals from the first pixels; detecting a second light component of the ambient light by averaging output signals from the second pixels; detects a third light component of the ambient light by averaging output signals from the third pixels; determines based on respective values of the first, second and third light components whether the ambient light is due to other an IR light source; and detects the ambient light level (1404). Based on a determination that the ambient light is due to other than an IR light source and the ambient light level exceeds a first lux threshold, the camera initiates a change of the camera mode to Day mode (1406). Based on a determination that the ambient light is due to other than an IR light source and the ambient light threshold does not exceed the first lux threshold, the camera mode is maintained in Night mode (1408).

In some implementations, the first, second and third light components are red, green and blue. In some implementations, the camera includes a gain controller that adjusts analog gain of the sensor array based on the ambient light level; such that detecting the ambient light level includes obtaining the analog gain of the sensor array. In some implementations, the analog gain of the sensor varies with a frame rate of the camera, such that the camera determines a first frame rate of the camera used to detect the first, second and third light components; and normalizes the obtained analog gain of the sensor based on a first difference between the first frame rate and a predefined frame rate and predefined associated differences in analog sensor gain based on the first difference. In some implementations, the camera includes an IR filter with a first position in which it is interposed between the lens and the sensor array and a second position in which it is not interposed between the lens and sensor array, such that, as part of initiating a change of the camera mode to the day mode, the camera switches the camera mode to the day mode and causes the IR filter to be moved from the second position to the first position.

Referring to FIG. 14B, in some implementations, the camera determines based on values of the first, second and third light components whether the ambient light is due to sunlight or an incandescent light source; and based on a determination that the ambient light is due to sunlight or an incandescent light source, initiates a change of the camera mode to the day mode only when the ambient light level exceeds a second lux threshold higher than the first lux threshold (1412).

In some implementations, the camera obtains a first ratio of the first to the second lighting components of the ambient light; obtains a second ratio of the third to the second lighting components of the ambient light; and obtains a graph characterizing respective types of light source based on a combination of the first and second ratios associated with the respective types of light sources; the camera determines whether the ambient light is due to other than an IR light source (e.g., as recited at step 1406) by determining based on the graph whether a light source characterized by the first ratio and the second ratio is other than an IR light source (1414). In some implementations, determining whether the ambient light is due to other than an IR light source includes determining that a point defined by the first ratio and the second ratio is substantially different from (1, 1). In some implementations, the camera includes an auto white balance processor that provides the obtained first and second ratios.

In some implementations, the graph identifies a first region defined by specific respective ranges of the first and the second ratios as being associated with sunlight or incandescent light sources; the camera determines whether the ambient light is due to sunlight or an incandescent light source (e.g., as recited at step 1414) by determining based on the graph whether a point defined by the first ratio and the second ratio lies within the first region (1416).

In some implementations, the graph is represented using two look-up tables, each addressable by a first index representing one of the first ratios and a second index representing one of the second ratios; wherein a first one of the lookup tables defines combinations of the first and second ratios associated respectively with IR light sources and other than IR light sources, and a second one of the lookup tables defines combinations of the first and second ratios associated with sunlight and incandescent lights (1418).

Referring to FIG. 14C, in some implementations, the first lookup table encodes with 1's first table locations associated with other than IR light sources and with 0's first table locations associated with IR light sources, such that the first lookup table is almost entirely filled with all 1's apart from table locations associated with pairs of first and second ratios substantially similar to (1.1) (1424).

In some implementations, the second lookup table corresponds to a higher-resolution version of a sub-region of the first lookup table, wherein the second lookup table encodes with 1's second table locations associated with sunlight and incandescent light sources and with 0's second table locations associated with other than sunlight and incandescent light sources (1426).

In some implementations, the color sensor array is one tile of a plurality of tiles in a color sensor array system and the method of claim 1 is performed for each of the tiles, such that a respective mode change signal is generated for a respective tile for which the ambient light at that respective tile is due to other than an IR light source prior to initiating the change of the camera mode to the day mode; in which the camera further: determines a total number of the mode change signals for the color sensor array system; determines whether the total number of the mode change signals exceeds a predetermined mode change threshold based on a total number of tiles in the color sensor array system; and when the total number of the mode change signals exceeds the mode change threshold, initiates the change of the camera mode to the day mode (1422).

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A camera mode control system for a camera, comprising:
   a controller,
   memory storing one or more programs for execution by the controller,
   a sensor array comprising a plurality of sensors,
   a lens assembly that is configured to focus light on the sensor array, and
   an IR filter;
   the one or more programs including instructions for:
      operating the camera in a night mode, wherein while in the night mode the IR filter is not interposed between the lens assembly and the sensor array, including:
         receiving at the sensor array ambient light that is not filtered by the IR filter;
         determining whether the received ambient light is due to a light source other than an IR light source;
         detecting a light level of the received ambient light;

based on a determination that the received ambient light is due to a light source other than an IR light source and that the light level of the received ambient light exceeds a first threshold, switching the operation of the camera from the night mode to a day mode; and based on a determination that the received ambient light that is due to a light source other than an IR light source and that the light level of the received ambient light does not exceed the first threshold, continuing operation of the camera in the night mode.

2. The method of claim 1, further comprising:
determining whether the received ambient light is due to sunlight or an incandescent light source; and
based on a determination that the received ambient light is due to sunlight or an incandescent light source, initiating a change of the camera mode to the day mode only when the light level of the received ambient light exceeds a second threshold higher than the first threshold.

3. The method of claim 1, wherein whether the received ambient light is due to a light source other than an IR light source is obtained based on respective values of a plurality of color components of the received ambient light.

4. The method of claim 1, wherein the plurality of sensors includes first, second and third pixels each having respective peak responses at different respective visible light frequencies, and determining whether the received ambient light is due to a light source other than an IR light source further comprises:
detecting a first light component of the received ambient light by averaging output signals from the first pixels;
detecting a second light component of the received ambient light by averaging output signals from the second pixels;
detecting a third light component of the received ambient light by averaging output signals from the third pixels; and
determining based on respective values of the first, second and third light components whether the received ambient light is due to a light source other than an IR light source.

5. The method of claim 4, further comprising:
obtaining a first ratio of the first to the second lighting components of the received ambient light;
obtaining a second ratio of the third to the second lighting components of the received ambient light; and
obtaining a graph characterizing respective types of light source based on a combination of the first and second ratios associated with the respective types of light sources;
wherein determining whether the received ambient light is due to a light source other than an IR light source includes determining based on the graph whether a light source characterized by the first ratio and the second ratio is other than an IR light source.

6. The method of claim 5, wherein the graph identifies a first region defined by specific respective ranges of the first and the second ratios as being associated with sunlight or incandescent light sources;
wherein determining whether the received ambient light is due to sunlight or an incandescent light source includes determining based on the graph whether a point defined by the first ratio and the second ratio lies within the first region.

7. The method of claim 5, wherein determining whether the received ambient light is due to a light source other than an IR light source includes determining that a point defined by the first ratio and the second ratio is substantially different from (1, 1).

8. The method of claim 5, wherein the camera includes an auto white balance processor that provides the obtained first and second ratios.

9. The method of claim 1, wherein the sensor array is one tile of a plurality of tiles in a sensor array system and the method of claim 1 is performed for each of the tiles, such that a respective mode change signal is generated for a respective tile for which the received ambient light at that respective tile is due to a light source other than an IR light source prior to initiating the change of the camera mode to the day mode, further comprising:
determining a total number of the mode change signals for the sensor array system;
determining whether the total number of the mode change signals exceeds a predetermined mode change threshold based on a total number of tiles in the sensor array system; and
when the total number of the mode change signals exceeds the mode change threshold, initiating the change of the camera mode to the day mode.

10. A camera mode control system for a camera, comprising:
a controller,
memory storing programs for execution by the controller,
a sensor array comprising a plurality of sensors,
a lens assembly that is configured to focus light on the sensor array, and
an IR filter;
the one or more programs including instructions for:
operating the camera in a night mode, wherein while in the night mode the IR filter is not interposed between the lens assembly and the sensor array, including:
receiving at the sensor array ambient light that is not filtered by the IR filter;
determining whether the received ambient light is due to a light source other than an IR light source;
detecting a light level of the received ambient light;
based on a determination that the received ambient light is due to a light source other than an IR light source and that the light level of the received ambient light exceeds a first threshold, switching the operation of the camera from the night mode to a day mode; and
based on a determination that the received ambient light that is due to a light source other than an IR light source and that the light level of the received ambient light does not exceed the first threshold, continuing operation of the camera in the night mode.

11. The system of claim 10, wherein the one or more programs further include instructions for:
determining whether the received ambient light is due to sunlight or an incandescent light source; and
based on a determination that the received ambient light is due to sunlight or an incandescent light source, initiating a change of the camera mode to the day mode only when the light level of the received ambient light exceeds a second threshold higher than the first threshold.

12. The system of claim 10, wherein the system includes a gain controller configured to adjust analog gain of the sensor array based on the light level of the received ambient light, and wherein detecting the light level of the received ambient light comprises obtaining the analog gain of the sensor array.

13. The system of claim 12, wherein the analog gain of the sensor array varies with a frame rate of the camera, and the one or more programs further include instructions for:
   determining a first frame rate of the camera used to detect the first, second and third light components; and
   normalizing the obtained analog gain of the sensor array based on a first difference between the first frame rate and a predefined frame rate and predefined associated differences in analog sensor gain based on the first difference.

14. The system of claim 10, wherein the IR filter has a first position in which it is interposed between the lens and the sensor array and a second position in which it is not interposed between the lens and sensor array, and the one or more programs further include instructions for in response to initiating a change of the camera mode to the day mode, switching the camera mode to the day mode and causing the IR filter to be moved from the second position to the first position.

15. The system of claim 10, wherein the sensor array is one tile of a plurality of tiles in a sensor array system and the instructions of claim 10 for operating the camera in the night mode are executed for each of the tiles, such that a respective mode change signal is generated for a respective tile for which the received ambient light at that respective tile is due to a light source other than an IR light source prior to initiating the change of the camera mode to the day mode, and wherein the one or more programs further include instructions for:
   determining a total number of the mode change signals for the sensor array system;
   determining whether the total number of the mode change signals exceeds a predetermined mode change threshold based on a total number of tiles in the sensor array system; and
   when the total number of the mode change signals exceeds the mode change threshold, initiating the change of the camera mode to the day mode.

16. A non-transitory computer readable storage medium storing one or programs for execution by a camera system including a controller, a sensor array comprising a plurality of sensors, a lens assembly that is configured to focus light on the sensor array, and an IR filter that is not interposed between the lens assembly and the sensor array in a night mode, the one or more programs comprising instructions for:
   operating the camera in a night mode, wherein while in the night mode the IR filter is not interposed between the lens assembly and the sensor array, including:
      receiving at the sensor array ambient light that is not filtered by the IR filter;
      determining whether the received ambient light is due to a light source other than an IR light source;
      detecting a light level of the received ambient light;
      based on a determination that the received ambient light is due to a light source other than an IR light source and that the light level of the received ambient light exceeds a first threshold, switching the operation of the camera from the night mode to a day mode; and
      based on a determination that the received ambient light that is due to a light source other than an IR light source and that the light level of the received ambient light does not exceed the first threshold, continuing operation of the camera in the night mode.

17. The non-transitory computer readable storage medium of claim 16, wherein the plurality of sensors includes first, second and third pixels each having respective peak responses at different respective visible light frequencies, and the instructions for determining whether the received ambient light is due to a light source other than an IR light source comprises instructions for:
   detecting a first light component of the received ambient light by averaging output signals from the first pixels;
   detecting a second light component of the received ambient light by averaging output signals from the second pixels;
   detecting a third light component of the received ambient light by averaging output signals from the third pixels; and
   determining based on respective values of the first, second and third light components whether the received ambient light is due to a light source other than an IR light source.

18. The non-transitory computer readable storage medium of claim 17, wherein the one or more programs further comprise instructions for:
   obtaining a first ratio of the first to the second lighting components of the received ambient light;
   obtaining a second ratio of the third to the second lighting components of the received ambient light; and
   obtaining a graph characterizing respective types of light source based on a combination of the first and second ratios associated with the respective types of light sources;
   wherein determining whether the received ambient light is due to a light source other than an IR light source includes determining based on the graph whether a light source characterized by the first ratio and the second ratio is other than an IR light source.

19. The non-transitory computer readable storage medium of claim 18, wherein the graph is represented using two look-up tables, each addressable by a first index representing one of the first ratios and a second index representing one of the second ratios, wherein a first one of the lookup tables defines combinations of the first and second ratios associated respectively with IR light sources and light sources other than IR light sources, and a second one of the lookup tables defines combinations of the first and second ratios associated with sunlight and incandescent lights.

20. The non-transitory computer readable storage medium of claim 19, wherein the first lookup table encodes with 1's to signify first table locations associated with a light source other than IR light sources and with 0's to signify first table locations associated with IR light sources, such that the first lookup table is almost entirely filled with all 1's apart from table locations associated with pairs of first and second ratios substantially similar to (1, 1).

* * * * *

UNITED STATES PATENT AND TRADEMARK OFFICE
CERTIFICATE OF CORRECTION

PATENT NO. : 9,549,124 B2
APPLICATION NO. : 15/158348
DATED : January 17, 2017
INVENTOR(S) : Duran et al.

Page 1 of 1

It is certified that error appears in the above-identified patent and that said Letters Patent is hereby corrected as shown below:

In the Claims

Claim 16, Column 53, Line 43, please delete "one or programs" and insert --one or more programs--.

Signed and Sealed this
Twenty-first Day of March, 2017

Michelle K. Lee
*Director of the United States Patent and Trademark Office*